INITIAL CHARGING POSITION

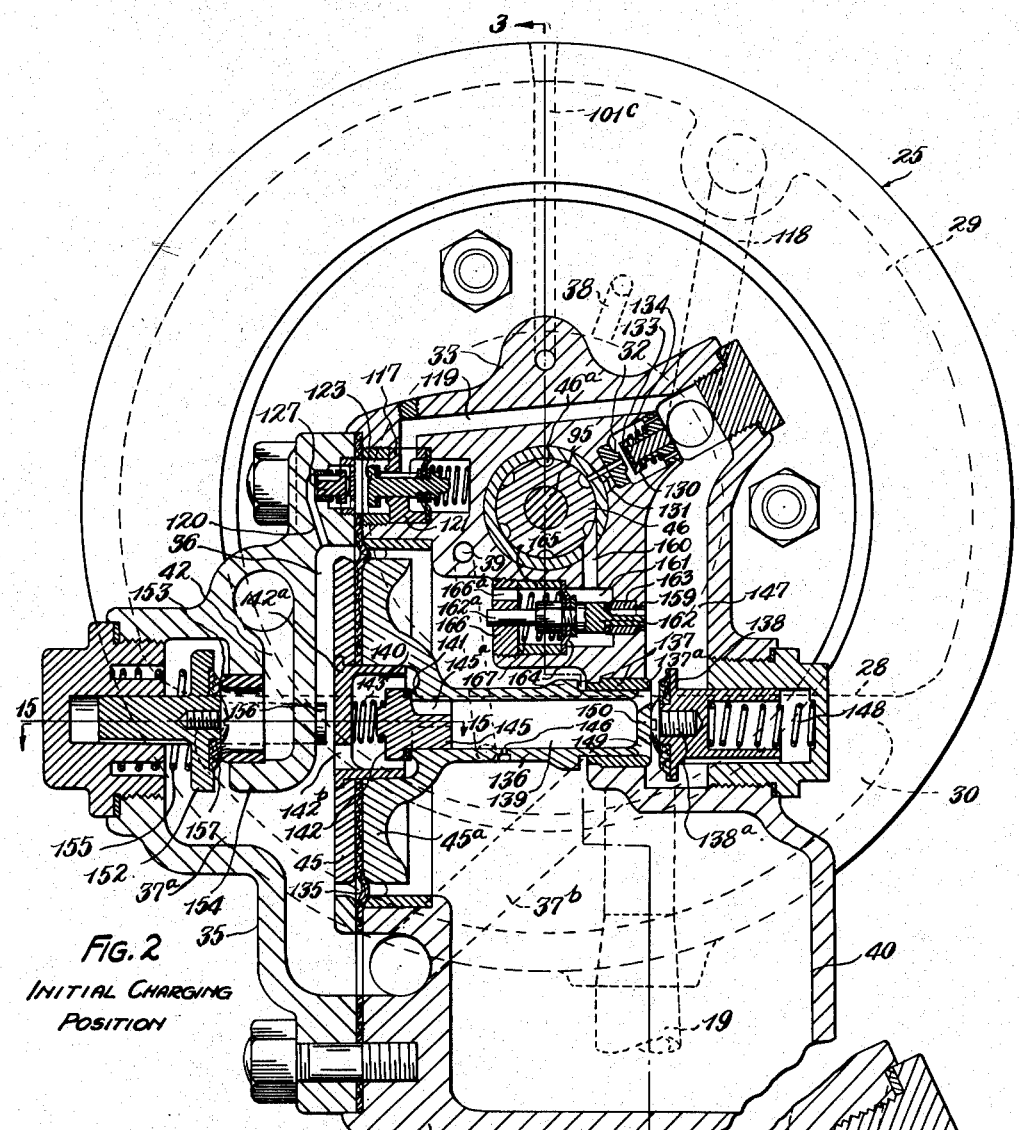
FIG. 2
INITIAL CHARGING POSITION
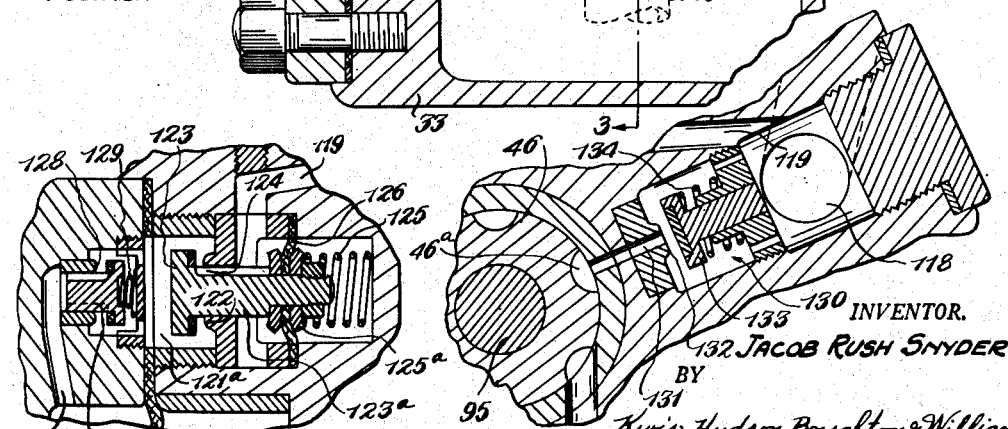
FIG. 13
FIG. 14
INVENTOR.
JACOB RUSH SNYDER
BY
Kwis, Hudson, Boughton & Williams
ATTORNEYS

INVENTOR.
JACOB RUSH SNYDER
BY
Kwis, Hudson, Boughton & Williams
ATTORNEYS

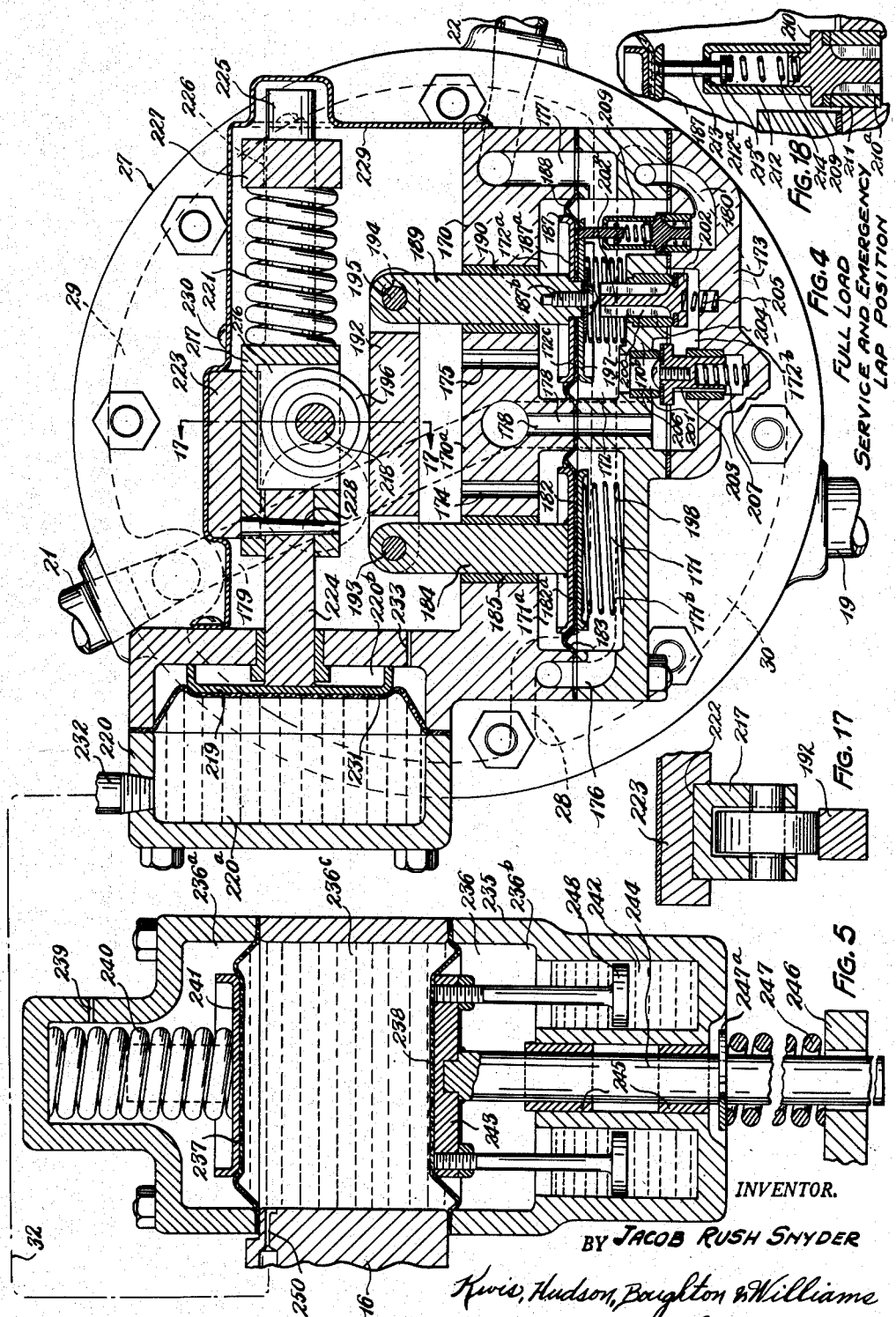

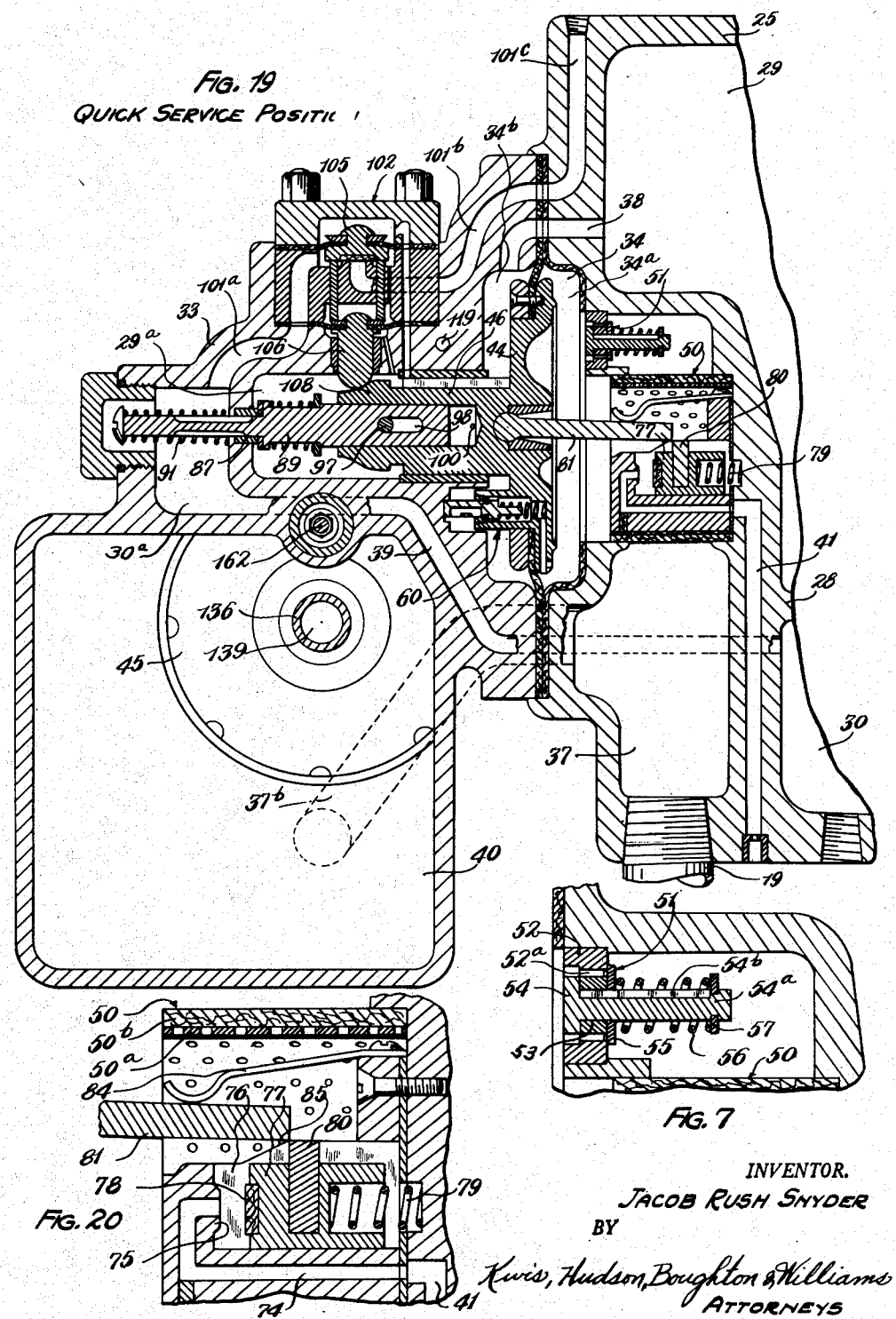

Feb. 24, 1953

J. R. SNYDER 2,629,638

AIR BRAKE APPARATUS

Filed June 5, 1947

QUICK SERVICE POSITION

INVENTOR.
JACOB RUSH SNYDER
BY
Kris, Hudson, Boughton & Williams
ATTORNEYS

Feb. 24, 1953   J. R. SNYDER   2,629,638
AIR BRAKE APPARATUS
Filed June 5, 1947   18 Sheets-Sheet 7

SERVICE POSITION

INVENTOR.
JACOB RUSH SNYDER
BY
Kwis, Hudson, Boughton & Williams
ATTORNEYS

Feb. 24, 1953   J. R. SNYDER   2,629,638
AIR BRAKE APPARATUS

Filed June 5, 1947   18 Sheets-Sheet 8

SERVICE LAP POSITION

INVENTOR.
JACOB RUSH SNYDER
BY Kwis, Hudson,
Boughton, & Williams
ATTORNEYS

Feb. 24, 1953  J. R. SNYDER  2,629,638
AIR BRAKE APPARATUS
Filed June 5, 1947  18 Sheets-Sheet 9

RELEASE AND RECHARGE POSITION
AFTER SERVICE APPLICATION

INVENTOR.
JACOB RUSH SNYDER
BY
Kwis, Hudson, Boughton & Williams
ATTORNEYS

EMERGENCY POSITION

INVENTOR.
JACOB RUSH SNYDER

Feb. 24, 1953   J. R. SNYDER   2,629,638
AIR BRAKE APPARATUS
Filed June 5, 1947   18 Sheets-Sheet 11

EMERGENCY POSITION

INVENTOR.
JACOB RUSH SNYDER
BY
Kwis, Hudson, Boughton & Williams
ATTORNEYS

SECOND STAGE EMERGENCY POSITION

INVENTOR.
JACOB RUSH SNYDER
BY
Kwis, Hudson, Boughton & Williams
ATTORNEYS

Feb. 24, 1953 J. R. SNYDER 2,629,638
AIR BRAKE APPARATUS
Filed June 5, 1947 18 Sheets-Sheet 13

EMERGENCY LAP POSITION

INVENTOR.
JACOB RUSH SNYDER
BY
Kwis, Hudson, Boughton & Williams
ATTORNEYS

Feb. 24, 1953 — J. R. SNYDER — 2,629,638
AIR BRAKE APPARATUS
Filed June 5, 1947 — 18 Sheets-Sheet 14

RESTRICTED RECHARGE POSITION

INVENTOR.
JACOB RUSH SNYDER
BY
Kwis, Hudson, Boughton & Williams
ATTORNEYS

INITIAL RELEASE POSITION AFTER
EMERGENCY APPLICATION

INVENTOR.
JACOB RUSH SNYDER

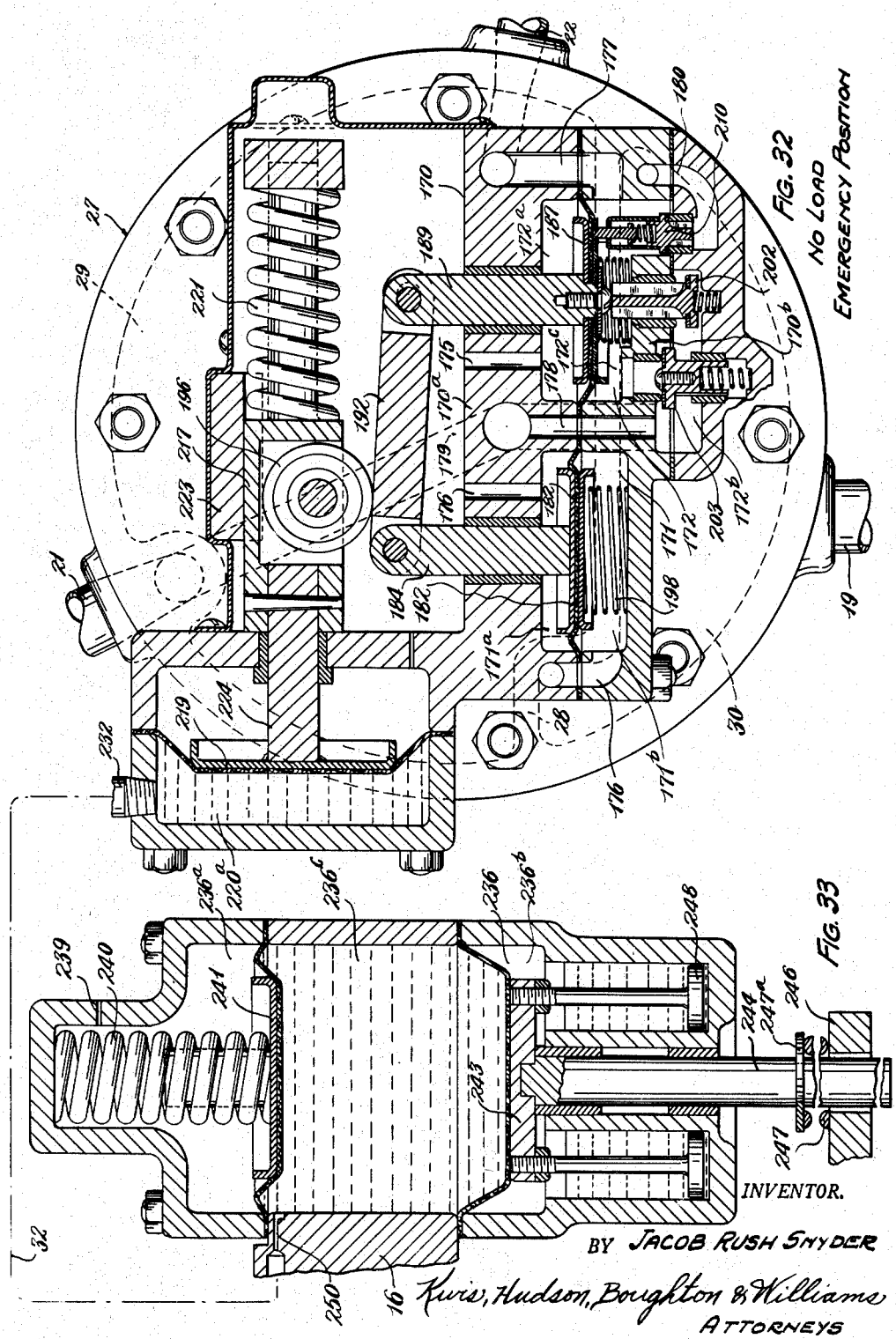

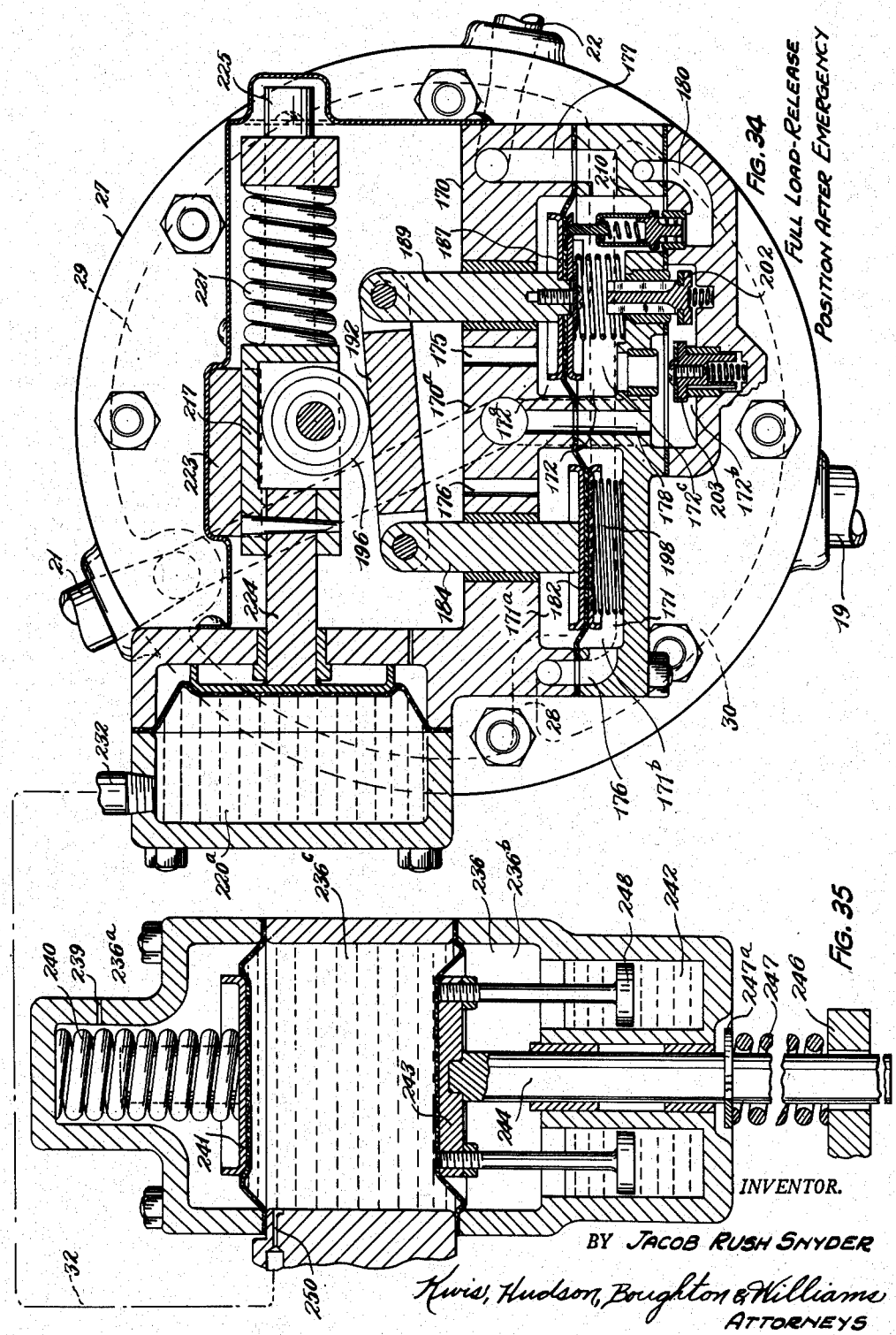

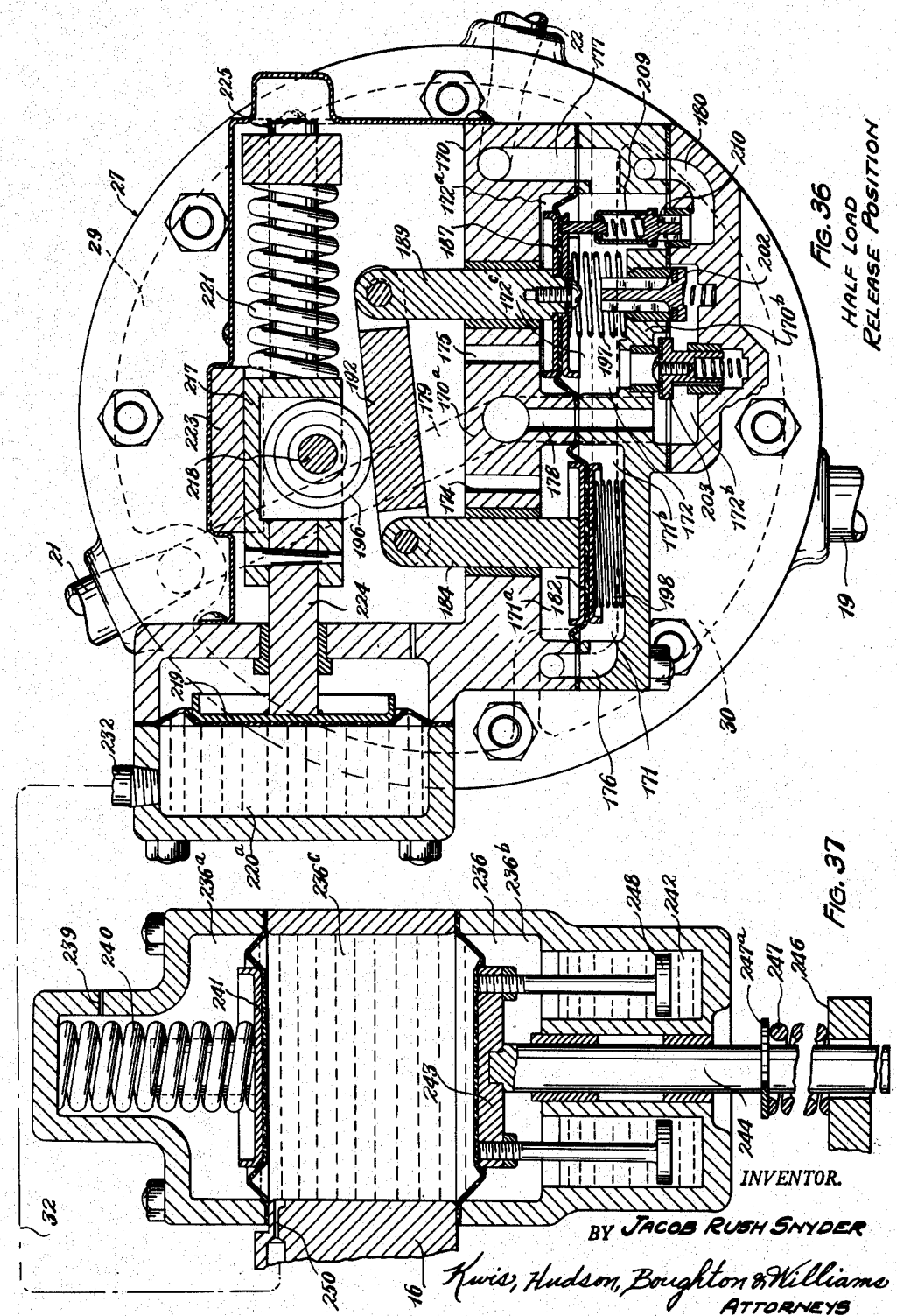

Patented Feb. 24, 1953

2,629,638

UNITED STATES PATENT OFFICE 2,629,638

AIR-BRAKE APPARATUS

Jacob Rush Snyder, Cleveland, Ohio

Application June 5, 1947, Serial No. 752,650

48 Claims. (Cl. 303—40)

This invention relates to fluid pressure brakes and, more particularly, to air brakes for railway freight cars and the like.

An object of the present invention is to provide an improved air brake apparatus which will function in an efficient, positive and dependable manner and which is of a relatively simple construction as compared with air brake apparatus heretofore provided such that the improved apparatus will be much less costly to manufacture and to maintain in an efficient operating condition.

Another object of this invention is to provide an improved control valve mechanism for railway air brakes which accomplishes all of the usual functions of a triple valve mechanism including the creation of impulse waves during both service and emergency rates of train pipe reduction, and which also accomplishes the important novel function of creating a brake-releasing impulse wave which assures the movement of individual valve mechanisms, and the valve mechanisms of adjacent cars, to release position such that the troublesome condition of "stuck" brakes is substantially eliminated.

Still another object of the invention is to provide improved air brake apparatus of this character in which brake cylinder pressure is developed, during service applications, in direct proportions to train pipe reductions regardless of numerous variable factors which usually exist such as uneven brake cylinder piston travel, brake cylinder leakage, wear on brake shoes and other moving parts and the improper functioning of slack adjusters.

A further object of this invention is to provide improved air brake apparatus of the character mentioned in which the control valve mechanism embodies novel means for effectively preventing the occurrence of an undesired emergency application of the brake when only a service application is desired and called for.

Yet another object is to provide improved air brake apparatus of the kind indicated, in which the control valve mechanism includes an emergency piston adapted to be shifted by the pressure of an emergency control chamber upon an emergency train pipe reduction of pressure but in which novel means is employed for effectively releasing the control chamber pressure during a service train pipe pressure reduction so as to prevent an undesired emergency application of the brake.

It is also an object of the present invention to provide improved air brake apparatus in which novel means is employed for automatically limiting the pressure of the motive fluid which is supplied to the brake cylinder during an emergency application, to a desired predetermined value and wherein the desired value can be varied to suit different train and track conditions.

A further object is to provide improved control valve mechanism by which a desired quick charging of the supply reservoir can be accomplished and in which the supply reservoir pressure can be maintained regardless of leakage depletion of train pipe and auxiliary reservoir pressures, such as when a car is left on a siding or is being shifted in train make-up yards, and wherein novel means is employed for utilizing supply reservoir pressure during an emergency application of the brake, as well as novel means for discharging supply reservoir pressure into the train pipe during release operation so as to create a release impulse wave thereby causing a positive release function and eliminating stuck brakes.

Still another object of this invention is to provide an improved air brake control valve mechanism in which novel vent valve means and novel vent valve actuating means are employed for controlling the local service and emergency vent passages, and wherein a novel retaining valve means is employed for controlling the exhaust passage of the application chamber.

As another of its objects this invention provides improved air brake apparatus in which a service application, or any desired number of service applications, of the brake can be made and can be followed immediately by an emergency application of the brake and a desired relatively high braking force will still be developed during the emergency application by reason of the fact that novel means is provided for discharging supply reservoir pressure into the auxiliary reservoir and application chamber during the emergency application.

This invention also provides improved control valve mechanism in which novel valve means is employed for controlling communication between the auxiliary reservoir and the train pipe so that the connecting passage therebetween will be automatically varied for different positions of the service piston to afford either a full or a restricted charging passage and will be automatically closed during service and emergency train pipe pressure reductions to prevent a return flow of pressure fluid from the auxiliary reservoir.

This invention can be further briefly summarized as consisting in certain novel combinations and arrangements of parts hereinafter described and particularly set out in the appended claims.

In the accompanying sheets of drawings—

Fig. 2 is a sectional view taken through the piston and valve section of the control valve mechanism substantially as indicated by section line 2—2 of Fig. 1.

Fig. 4 is a sectional view taken through the variable load section of the control valve mechanism substantially as indicated by section line 4—4 of Fig. 1.

Fig. 5 is a sectional view taken through the hydraulic pressure generating device of the load responsive mechanism as indicated by line 5—5 of Fig. 1.

Fig. 6 is a sectional view taken through the pressure limiting valve which is located in the pipe line to the brake cylinder as shown in Fig. 1.

Fig. 7 is a sectional view showing the double acting strainer by-pass check valve device of Fig. 3 on a larger scale.

Fig. 13 is a sectional view showing the supply reservoir quick-charging valve device of Fig. 2 on a larger scale.

Fig. 14 is a sectional view showing the normal supply reservoir charging valve of Fig. 2 on a larger scale.

Fig. 17 is a partial vertical sectional view taken through the fulcrum and fulcrum carrier of the variable load mechanism as indicated by line 17—17 of Fig. 4.

Fig. 18 is a sectional view showing the brake cylinder vent valve device of Fig. 4 on a larger scale.

Fig. 19 is a sectional view similar to Fig. 3 but showing the service piston and adjacent valve devices in quick service position.

Fig. 20 is a sectional view showing the service vent valve in the same position as in Fig. 19 but on a larger scale.

Figs. 32 and 33 are sectional views similar to Figs. 4 and 5 respectively, but showing the variable load mechanism and adjacent valve devices in emergency position and corresponding with an empty condition of the car.

Figs. 34 and 35 are sectional views similar to Figs. 4 and 5 respectively, but showing the variable load mechanism and adjacent valve devices in release position after an emergency application of the brake and corresponding with a substantially fully loaded condition of the car, and Figs. 36 and 37 are sectional views similar to Figs. 4 and 5 respectively, but showing the variable load mechanism and adjacent valve devices in release position and corresponding with a substantially half loaded condition of the car.

Figure 1:
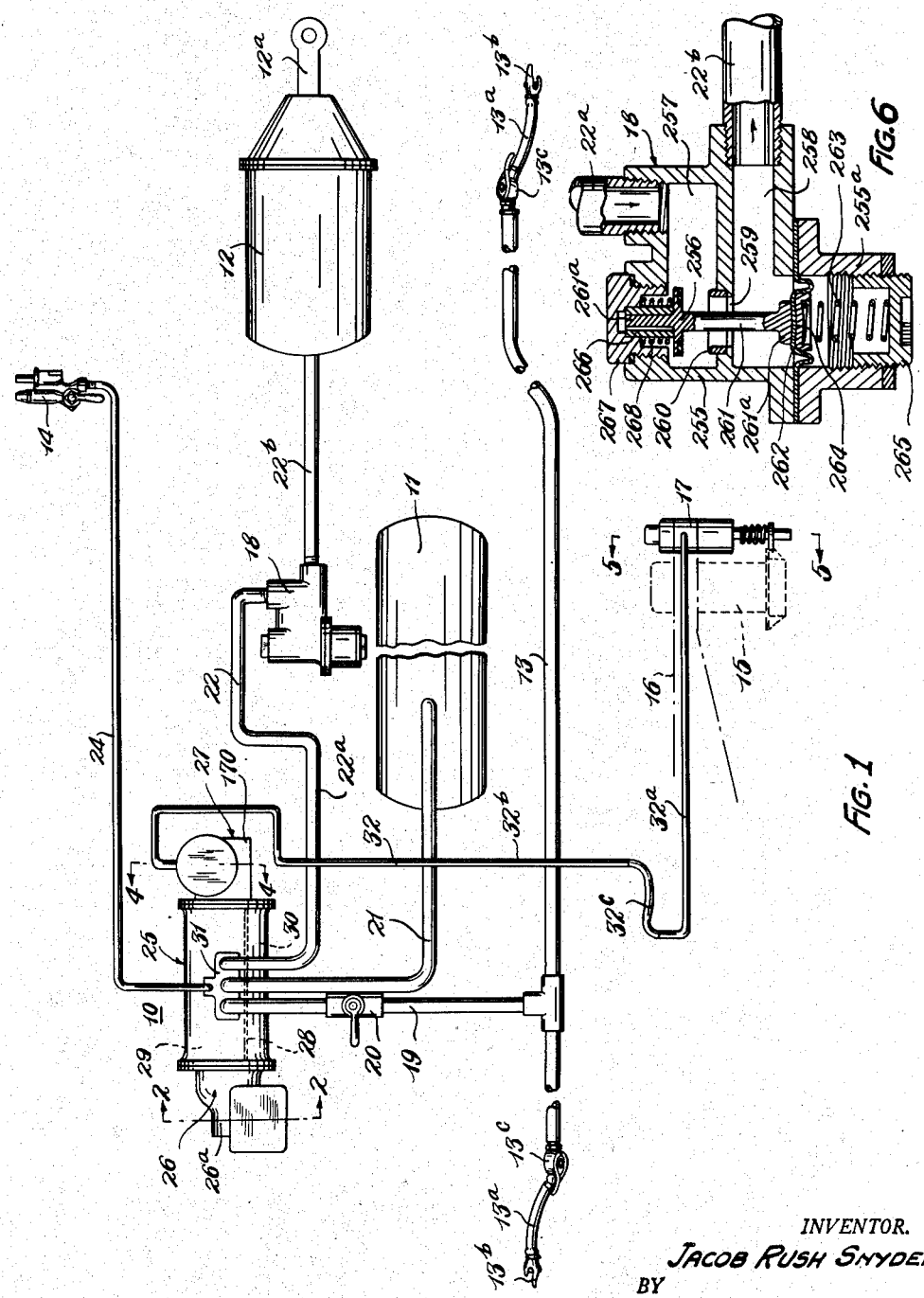
Fig. 1 is a diagrammatic view of the improved air brake apparatus showing a general arrangement thereof such as might be used on a railway car.

As one practical embodiment of the invention Fig. 1 shows the improved air brake apparatus adapted for use on a railway car. The improved apparatus comprises in general a control valve mechanism 10, a supply reservoir 11 and a brake cylinder 12. The apparatus also includes a train pipe 13 and a retaining valve 14. The railway car on which the apparatus is used may be a conventional car of this kind, such as a freight car having wheeled trucks, one of which is indicated at 15, and bolsters 16 which are movable relative to the trucks in response to variations in the weight of the load being carried by the car. The improved apparatus as here shown also includes a hydraulic pressure generating device 17 which is responsive to such variation in the load and a valve device 18 for limiting the pressure of the motive fluid which is supplied to the brake cylinder 12 during an emergency application of the brake.

The supply reservoir 11 is a pressure tank, of any suitable construction, adapted to contain a supply of air under pressure and having a volume appropriate for accomplishing the intended functioning of the improved air brake apparatus. The brake cylinder 12 may be of a conventional type having a reciprocable piston operable therein in response to pressure fluid supplied to the cylinder and a piston rod 12a adapted to be connected with the brake shoes (not shown) by appropriate linkage.

The train pipe 13 can be the usual train pipe extending longitudinally of the car and provided at its ends with flexible hose connections 13a which carry coupling members 13b by which this pipe is adapted to be connected with similar train pipes of adjacent cars. The train pipe is also provided with the usual angle cocks 13c located adjacent the hose connections 13a and by which the passage of the train pipe can be closed at these points when desired.

As shown in Fig. 1, the train pipe 13 is connected with the control valve mechanism 10 by a branch pipe 19 which may have a cut-out cock and dirt collecting device 20 located therein. The supply reservoir 11 may be connected with the control valve mechanism 10 by the pipe 21. The brake cylinder 12 may be connected with the control valve mechanism 10 through a pressure limiting valve device 18 and by means of a pipe line 22 comprising the sections 22a and 22b. The valve 14 can be a conventional manually operable retaining valve which is connected with the control valve mechanism 10 by a small pipe line 24.

The control valve mechanism 10 will be described in greater detail hereinafter but it is desirable at this point to explain that this mechanism can be contained in a single housing or assembly unit which is here shown as comprising an intermediate reservoir section 25 and two end sections 26 and 27 connected therewith. The end section 26 contains the service and emergency pistons and a number of valve devices associated therewith and, therefore, can be conveniently called a control valve section. The end section 27 contains certain valve devices and certain load responsive mechanism associated therewith and, therefore, can be appropriately termed the variable load section.

The intermediate housing section 25 is here shown as being an elongated tank-like structure having the interior thereof divided into two chambers by a longitudinal partition wall 28 so as to form therein an auxiliary reservoir 29 and an application chamber 30. The intermediate housing section 25 may also be provided with a pipe bracket or manifold portion 31 with which the above mentioned pipes 19, 21, 22 and 24 are connected. It should also be mentioned at this point that the hydraulic pressure generating device 17 is connected with the variable load section 27 of the control valve mechanism 10 by a pipe line 32 which includes pipe sections 32a and 32b having their adjacent ends connected by a flexible hose portion 32c.

Figures 3, 8, 9, 10:
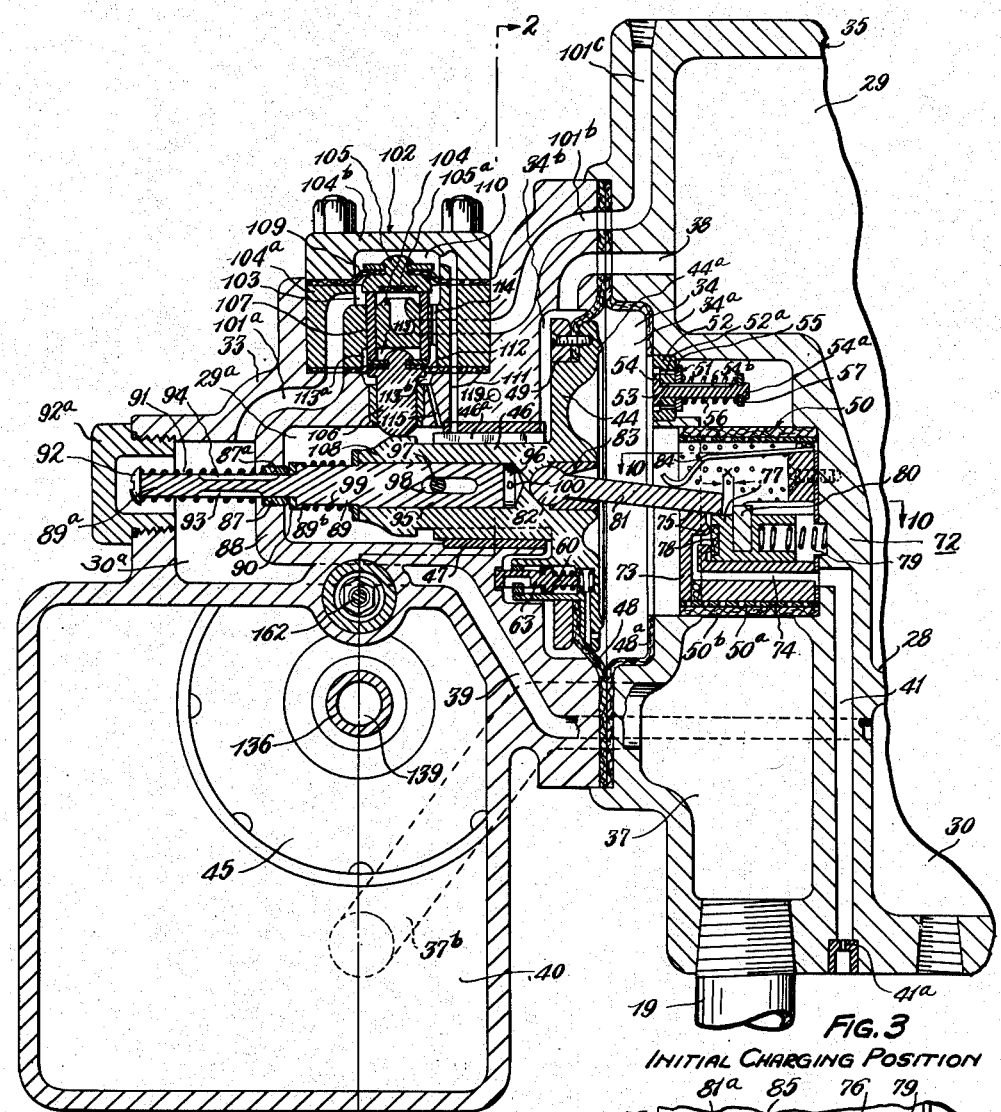
Fig. 3 is another sectional view taken through the piston and valve section of the control valve mechanism substantially as indicated by section line 3—3 of Fig. 2.
Fig. 8 is a sectional view showing the auxiliary reservoir charging valve of Fig. 3 on a larger scale.
Fig. 9 is a transverse sectional detail view taken on line 9—9 of Fig. 8.
Fig. 10 is a partial sectional plan view taken on line 10—10 of Fig. 3 and further illustrating the service vent valve.

The control valve section 26 of the mechanism 10 will now be described and for this purpose reference will be had to Figs. 2 and 3 in which the various parts are shown in positions corresponding with the initial charging position. The housing portion 26a of the control valve section 26 may be of any suitable construction and, as shown in Figs. 2 and 3, includes a housing member 33 which is connected with one end of the intermediate section 25 and cooperates therewith in forming a service piston chamber 34. The housing portion 26a may also include a housing member 35 which is connected with the housing member 33 so as to cooperate with the latter in forming an emergency piston chamber 36.

The left end of the intermediate housing section to which the housing member 33 is connected contains an inlet chamber 37 with which the train pipe connection 19 communicates. The housing member 33 also contains a chamber 29a which constitutes a portion of the auxiliary reservoir 29 and is connected with the latter through the passage 38. The housing member 33 also contains a chamber 30a which constitutes a portion of the application chamber 30 and is connected with the latter by the passage 39. As shown in Fig. 2, the housing member 33 also contains a so-called emergency and release control chamber 40 which is a chamber of relatively small volume and whose purpose will be described hereinafter.

The housing member 35 contains a chamber 37a, as shown in Fig. 2, which constitutes a part of the inlet chamber 37 since it is in direct communication therewith through the relatively large passage 37b. In addition to the chambers and passages already mentioned in the end section 26, housing member 33 also contains a service vent passage 41 which communicates with the atmosphere through the restricted opening 41a and the housing member 35 contains an emergency vent passage 42 which also leads to the atmosphere, but is of materially greater cross-sectional area than the service vent passage 41.

As mentioned above, control valve section 26 contains the service and emergency pistons 44 and 45 which are located respectively in the service and emergency piston chambers 34 and 36. The service piston 44 has a body portion 44a and a central stem 46 which projects from one side thereof and is slidably mounted in a bushing 47 of the housing member 33 for supporting and guiding the piston during its movements in the chamber 34. As shown in Figs. 2 and 3, the piston stem 46 has a plurality of circumferentially spaced longitudinal grooves 46a therein forming a group of air passages which connect the chamber 29a with the service piston chamber 34b.

The service piston 44 is preferably of the diaphragm type, that is to say, is sealed by means of a flexible diaphragm 48 having its inner edge portion connected to the piston body 44a by the clamping ring 49 and its outer edge portion clamped between the intermediate housing section 25 and the housing member 33. The piston 44 and the diaphragm 48 divide the piston chamber 34 into compartments 34a and 34b of which the compartment 34a is connected with the inlet chamber 37 and the compartment 34b is connected with the auxiliary reservoir 29 and the chamber 29a. The connection between the compartment 34b and the chamber 29a is established through the axial grooves 46a of the piston stem 46. The connection between the compartment 34a and the inlet chamber 37 is established through a strainer 50 which may be of any suitable construction and is here shown as comprising a perforated metal sleeve 50a and a fibrous filter sleeve 50b disposed around the perforated sleeve. The strainer 50 serves to remove dust or any other foreign matter which may be carried into the inlet chamber by the compressed air being supplied thereto from the train pipe 13.

If the strainer 50 should become clogged the communication between the inlet chamber 37 and the compartment 34a of the service piston chamber 34 is established through a novel check valve device 51. As shown in the larger scale view of Fig. 7, this check valve device includes a valve body 52 mounted in the intermediate housing section 25 and having one or more air passages 52a therein and a substantially central guide opening 53. This check valve device also includes two check valve elements 54 and 55 seating against opposite sides of the valve body 52 so that the valve element 54 controls the air passage formed by the central opening 53 and the valve element 55 controls the air passages 52a. The valve element 54 has a stem 54a which extends through the central opening 53 of the valve body 52 and is movable therein. The stem has a groove 54b therein which forms a passage for the fluid when the valve element 54 is in its open position. A compression spring 56 disposed around the stem 54a acts simultaneously against the valve element 55 and a shoulder 57 of the stem for urging both valve elements into seating engagement with opposite sides of the valve body 52.

In the event that the strainer 50 becomes clogged, as mentioned above, pressure fluid from the inlet chamber 37 will pass through the central opening 53 of the valve body 52 and will shift the valve element 54 to its open position in opposition to the spring 56 thereby permitting the fluid pressure to enter the service piston chamber 34. When a train pipe pressure reduction is made for the purpose of causing either a service or emergency application of brake as explained hereinafter, air pressure in the service piston chamber 34 will act through the passages 52a and will unseat the valve element 55 in opposition to the compression spring 56. It will thus be seen that the check valve device 51 is a double acting check valve of a very simple construction but which will function efficiently to permit the desired operation of the apparatus in the event that the strainer 50 becomes clogged.

Figure 31:
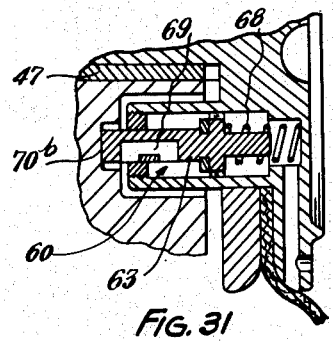
Fig. 31 is a partial sectional view showing the auxiliary reservoir charging valve in the same position as in Fig. 30 but on a larger scale.
Figure 29:
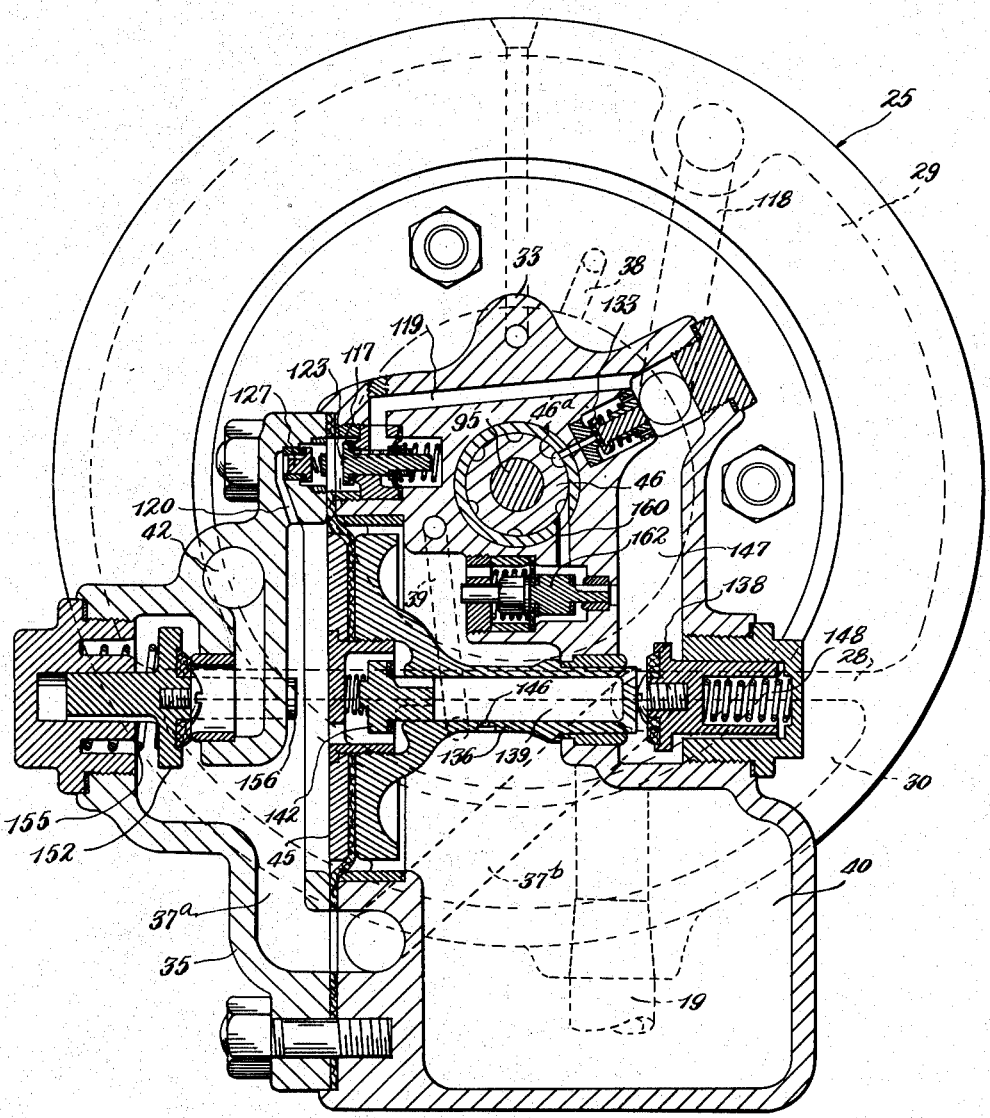
Fig. 29 is a sectional view similar to Fig. 2 but showing the emergency piston and adjacent valve devices in release position following service or emergency application of the brake.

The charging of the auxiliary reservoir 29 from the inlet chamber 37 is accomplished through a novel charging valve device 60 carried by the service piston 44. As shown in Figs. 3, 8 and 31, this valve device comprises a hollow projection 61 carried by the service piston 44 and having a valve chamber 62 therein, and a valve element 63 which is movable in the valve chamber. One end of the valve chamber 62 is connected with the compartment 34a of the service piston chamber through a small charging passage 64 and at its other end is provided with a seat member 65 having a central opening in which the valve element 63 is guided.

The valve element 63 has an enlarged portion or shoulder 63a thereon which is also guided in the valve chamber 62 and has a plurality of peripheral grooves 66 which permit a flow of air through the valve chamber around this enlarged portion. The enlarged portion 63a is also provided with a packing member 67 on one side thereof which is engagable with the seat member 65 under the influence of a compression spring 68 seating against the other side of the enlargement. The portion of the valve element 63 which extends through the seat member 65 forms a projecting stem 63a and contains an air passage 69 whose ends constitute ports 69a and 69b in the side wall of the valve element.

The housing member 33 is provided with a recess 70 which accommodates the valve projection 61 of the service piston 44 when the latter is in a charging position, as shown in Figs. 3, 8 and 31, and this recess has an extension portion 70a into which the stem portion 63a of the valve element 63 extends. The end wall 70b of the recess extension 70a forms a thrust surface which is adapted to be engaged by the stem portion 63a, as shown in Fig. 8, for causing a desired shifting of the valve element 63 relative to the seat member 65 for decreasing the size of the valve passage 69 as the service piston 44 is shifted in either direction from its initial charging position. When the service piston is shifted to a position remote from the housing member 33, the enlargement 63a will be moved into engagement with the seat member 65 by the spring 68 and the valve passage 69 will then be entirely closed. The significance of the different positions of the charging valve member 63 will be explained more fully hereinafter.

The service vent passage 41 is controlled by a novel vent valve device 72 which will be described next. This vent valve device is located adjacent the service piston 44 and comprises a valve body 73 (see Fig. 3) having a passage 74 therein which communicates with the vent passage 41. The valve body 73 carries a valve seat 75 which is located in surrounding relation to the inner end of the passage 74. The valve seat 75 is formed on the side of the valve body 73 which is remote from the service piston 44 so as to lie adjacent a recess or guideway 76 which is formed in the valve body and extends in a direction opposite that of the piston stem 46. This vent valve device 72 also includes a valve element 77 which is slidable in the guideway 76 and carries a packing 78 for engagement with the valve seat 75. A compression spring 79 having one end seating in a recess of the valve element 77 urges the latter toward the seat 75.

From the construction just described, it will be seen that the vent valve device 72 is a self-closing valve which normally maintains the vent passage 41 closed. This valve device is adapted for actuation by the service piston 44 and for this purpose is provided with a pin or shoulder 80 which is located to be engaged by the free end of a thrust member or push rod 81 carried by the service piston. The thrust member 81 has its other end pivotally connected with the service piston 44 as by means of a head 82 formed on this thrust member and rockably retained in a recess of the piston by means of the bushing 83. The outer or free end of the thrust member 81 rests upon the upper surface of the valve element 77 at a point adjacent the pin 80 and is urged toward engagement with the valve element by means of the leaf spring 84. The thrust member 81 is shown in Figs. 3 and 10 as being in its set position in which it will engage the pin 80 and cause opening of the valve element 77 during movement of the service piston 44 toward the right.

To permit closing of the valve element 77 by the spring 79 after the desired opening thereof has been effected by the thrust member 81, a disengaging means is provided which automatically disengages the thrust member from the pin 80. This disengaging means is here shown as comprising inclined surfaces 85 formed on the valve body 73 and located on opposite sides of the guideway 76, as shown in Figs. 3, 10 and 20. The thrust member 81 can be of any appropriate cross-sectional shape and, in this instance, is provided at its free end with lateral projections forming a head portion 81a which is slidable on the inclined surfaces 85 during the actuation of the thrust member 81 by the service piston 44. As the head portion 81a travels up the inclined surfaces 85 it will be forcibly disengaged from the pin 80 and, when this occurs, the spring 79 will cause the valve element 77 to be quickly moved to its closed position against the seat 75. Fig. 20 of the drawings shows the head portion 81a of the thrust member at the point where it has traveled up the inclined surfaces 85 and is about to release the pin 80 of the valve element 77.

Figure 11:
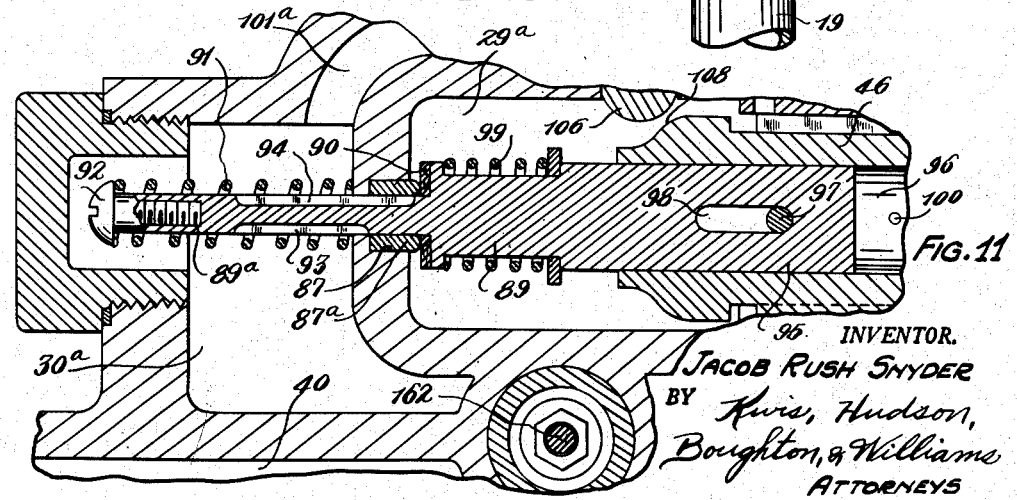
Fig. 11 is a sectional view showing the application chamber inlet valve of Fig. 3 on a larger scale.

Pressure fluid is supplied to the application chamber 30 from the auxiliary reservoir 29 through a passage 87 which extends through the wall 88 and connects the chamber 29a with the chamber 30a. The passage 87 is controlled by an inlet valve 89 (see Figs. 3 and 11) of the poppet type having a reduced stem portion 89a extending through and guided in this passage. A bushing 87a mounted in the wall 88 forms a valve seat which is engaged by a packing 90 carried by the valve element 89 when the latter is urged to its closed position by a compression spring 91 disposed around the stem portion 89a. One end of the spring 91 seats against the wall 88 and its other end seats against a shoulder or screw 92 carried by the stem portion 89a. The compression of this spring can be adjusted by means of the screw 92, access thereto being had by removing the plug 92a.

The valve element 89 is located substantially on the axis of the stem 46 of the service piston 44 and is adapted to be acuated by shifting of this piston. The stem portion 89a is provided with a plurality of grooves which form the valve passages and which include a relatively short passage 93 and a relatively long passage 94. These passages are disposed so that when opening movement is imparted to the valve element 89 the longer passage 94 will be opened first by being moved beyond the valve seat 87 to establish communication between the auxiliary reservoir chamber portion 29a and the application chamber portion 30a. When further movement of the valve element 89 takes place the shorter passage 93 will be opened to increase the area of the communication between the chamber 29a and the chamber 30a. The relatively long passage 94 provides the communication to the chamber 30a during a service application of the brake and the two passages 93 and 94 together provide a relatively larger communication with the application chamber during an emergency application of the brake.

The valve element 89 is connected with the service piston 44, preferably by having a plunger portion 95 disposed in an auxiliary cylinder 96 formed in the stem 46 of this piston and by means of a lost-motion connection formed by the cooperating pin and slot elements 97 and 98. The slot 98 is formed in the plunger portion 95 of the valve element 89 and the pin 97 is carried by the piston stem 46 and extends through the slot. The length of the slot is such as to permit a limited relative shifting between the valve element 89 and the service piston 44.

A compression spring 99 disposed around the intermediate portion of the valve element 89 seats against the outer end of the piston stem 46 and against the shoulder 89b of the valve element. This spring reacts against the stem of the piston 44 for determining the position of the latter during the functioning of the apparatus, as will be further described hereinafter. The auxiliary cylinder 96 is in communication with the auxiliary reservoir 29 through a small passage 100 so that auxiliary reservoir pressure acts continuously on the end of the plunger 95, tending to urge the valve element 89 toward its closed position.

Figure 12:
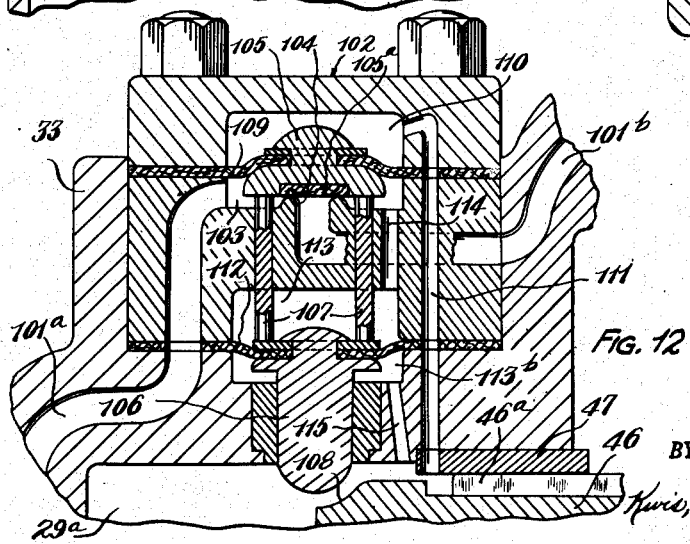
Fig. 12 is a sectional view showing the application chamber release valve of Fig. 3 on a larger scale.

Provision is made for exhausting fluid from the application chamber 30 and for this purpose a vent passage comprising the passage portions 101a, 101b and 101c connects the chamber 30a with atmosphere. This atmosphere connection is controlled by a release valve device 102 (see Figs. 3 and 12) having a valve chamber 103 which forms a portion of the vent passage and is located between the passage portions 101a and 101b. This vent valve device is provided with the valve body portions 104a and 104b which are suitably connected with the housing member 33 to form the valve chamber 103. The valve device 102 also includes a valve seat 104 formed on the body member 104a and a movable valve element 105 of the poppet type which cooperates with this valve seat. The valve element 105 carries a suitable packing 105a for sealing engagement with the seat.

The valve element 105 is actuated in part by fluid pressure and in part by positive thrust supplied thereto by the stem 46 of the service piston 44, the positive thrust being used to impart opening movement to the valve element and the fluid pressure being utilized primarily to urge the valve element toward its closed position. The opening thrust can be transmitted to the valve element 105 by means of a plunger 106 which is movable in a direction transversely to the axis of the piston stem 46 and a plurality of push pins 107 which are disposed between the valve element and the plunger. The piston stem 46 carries a cam 108 which cooperates with the rounded lower end of the plunger 106 so that movement of the service piston 44 toward the left will cause valve-opening movement to be imparted to the plunger by this cam. When the piston 44 is shifted toward the right, the cam 108 moves away from the plunger 106 permitting the latter to shift downwardly and thereby allowing the valve element 105 to be moved toward its closed position by fluid pressure.

In order to utilize fluid pressure in connection with the actuation of the valve element 105, a diaphragm 109 is connected with this valve element and separates the valve chamber 103 from a pressure chamber 110 which is located above the diaphragm and is in open communication with the auxiliary reservoir through passage 111. A second diaphragm 112 is connected with the upper end of the plunger 106 and divides the plunger chamber 113 into upper and lower compartments 113a and 113b. The upper compartment 113a is in communication with the valve chamber 103 through the passage 114, and hence, the intermediate or adjacent faces of the upper diaphragm 109 and the lower diaphragm 112 are acted upon by the pressure of the application chamber 30. The lower compartment 113b of the plunger chamber 113 is constantly in communication with the auxiliary reservoir through the passage 115.

The areas of the exposed upper and lower faces of the upper diaphragm 109 are somewhat larger than the exposed upper and lower faces of the lower diaphragm 112 so that auxiliary reservoir pressure acting in a direction tending to close the valve element 105 will predominate. The pressures acting on the diaphragms in the opposite direction will serve as a counterbalancing force for the valve element 105 so that it will be capable of being readily moved in a positive manner by a relatively small amount of thrust transmitted by the plunger 106 and the push pins 107, but this counterbalancing force will not be great enough to prevent an assured quick closing movement of the valve element whenever the cam 108 releases the plunger 106.

As indicated above, the portion of the end section 26 in which the emergency piston 45 is located contains an inlet chamber portion 37a which is connected with the inlet chamber 37 by the relatively large connecting passage 37b. The supply reservoir 11 is adapted to be initially charged to a predetermined pressure, such as 50 p. s. i., through novel quick charging means. During this quick charging of the supply reservoir, pressure fluid is supplied thereto from the inlet chamber 37a through the emergency piston chamber 36 and through a quick charging valve device 117, which is illustrated in Figs. 2 and 13 and will be described next. The supply reservoir is connected with the emergency piston chamber 36 through passages 118, 119 and 120 and the quick charging valve device 117 is located between the passages 119 and 120 as shown in Fig. 2.

The quick charging valve device 117 comprises a valve body 121 mounted in the housing member 33 and having a valve seat 122 formed thereon, and a movable valve member 123 which cooperates with the valve seat and is carried by a stem 123a which is movable in an opening of the valve body. The stem 123a is provided with a valve passage 124 which connects the passage 119 with the valve chamber 121a when the valve member 123 is moved away from the seat 122. The valve member 123 is urged towards its open position by means of a compression spring 125 which acts against a spring seat 125a carried by the inner end of the stem 123a.

A diaphragm 126 is also connected with the stem 123a and is constantly exposed to and acted upon by the pressure of the supply reservoir 11. So long as the pressure in the supply reservoir remains below a predetermined value, the spring 125 will predominate and will maintain the valve member 123 in its open position. When the supply reservoir pressure reaches the predetermined value such pressure acting on the diaphragm 126 will overcome the spring 125 and cause the valve member 123 to be closed by engagement with the seat 122.

The charging valve device 117 also includes a check valve member 127 which is disposed between the valve chamber 121a and the charging passage 120. This check valve member is normally urged toward a closed position in engagement with a seat 128 by the compression spring 129 but is adapted to be opened by the pressure of the fluid being supplied from the inlet chamber 37a. The check valve member 127 will be automatically closed whenever there is a tendency for a return flow of fluid from the supply reservoir 11 toward the passage 120.

Since the valve device 117 will remain in an open position until the supply reservoir pressure has been built up to the desired predetermined value, it will provide for a quick charging of the supply reservoir 11 from the inlet chamber 37a such that the initial charge in the supply reservoir can be very quickly brought up to the predetermined value at which the valve member 123 closes. When this valve member closes, the subsequent charging of the supply reservoir 11 takes place through a second charging valve 130 which is shown in Figs. 2 and 14. This second charging valve controls a charging passage 131 which connects the supply reservoir with the auxiliary reservoir through one of the grooves 46a of the service piston stem 46.

The second charging valve 130 comprises a valve seat 132 disposed around the passage 131 (see Fig. 14) and a movable valve element 133 which is urged toward this seat by a compression spring 134. The force of the spring 134 is such that so long as the supply reservoir pressure is lower than auxiliary reservoir pressure, the latter pressure will maintain the valve member 133 in its open position and the charging of the supply reservoir will continue through the passage 131. When the pressure in the supply reservoir reaches the desired value, the valve member 133 will be closed by the spring 134 and will remain closed until the supply reservoir requires recharging.

As shown in Fig. 2 the emergency piston 45 is located in the emergency piston chamber 36 and forms a shiftable partition between this chamber and the release control chamber 40. This piston is preferably of the diaphragm type, that is to say, it has a piston body 45a operably supported by a sealing diaphragm 135 which forms a portion of the partition between the piston chamber 36 and the release control chamber 40. The body 45a of this piston includes an axial hollow stem projection 136 which extends into the release control chamber 40 and has its inner end slidably guided in a bushing 137 which is mounted in the housing member 33. The exposed end 137a of this bushing forms a valve seat with which a supply reservoir discharge valve 138 of the poppet type cooperates. The passage 139 of the hollow stem 136 forms a connecting passage between the valve seat 137a and a check valve chamber 140 formed in the body of the emergency piston 45.

A valve seat 141 formed on the piston body 45a surrounds the outer end of the passage 139 and is adapted to be engaged by a check valve member 142 located in the check valve chamber 140. A plug 142a mounted in the piston body forms a cover for the valve chamber 140 and has an opening 142b therein which connects the check valve chamber with the inlet chamber 37a. A compression spring 143 located in the check valve chamber 140 acts on the valve member 142 urging the latter toward engagement with the seat 141. The check valve member 142 preferably has a stem portion 145 which is slidable in the passage 139 of the hollow stem 136 and has slots 145a formed therein which accommodates the flow of pressure fluid when the valve member is moved away from the valve seat. The release control chamber 40 is a pressure chamber of relatively small volume as compared with the auxiliary reservoir and is constantly in communication with the passage 139 through a restricted opening or orifice 146.

The supply reservoir discharge valve 138 referred to above controls a discharge passage 147 of relatively large size leading from the supply reservoir 11. The valve member 138 is normally held in a closed position in engagement with the valve seat 137a by the compression spring 148 but is adapted to be engaged and opened by the end of the stem 136 of the emergency piston 45. This end of the piston stem has openings 149 therein for admitting supply reservoir pressure to the passage 139 when the valve member 138 has been moved off its seat to a position such as that shown in Fig. 2. The end of the stem is provided with a transverse wall portion or bar 150 which is adapted to engage the valve member 138 or the head of the packing screw 138a thereof to cause opening of this valve member in opposition to the spring 148 when the emergency piston 45 is shifted toward the right as seen in Fig. 2.

As mentioned above the inlet chamber 37a is connected with the atmosphere by a relatively large emergency vent passage 42. This vent passage is controlled by an emergency vent valve member 152 of the poppet type. A valve seat 153 carried by a valve body portion 154 of the housing member 35 is disposed around the inner end of the vent passage 42 and is adapted to be engaged by the valve member 152. This valve member is urged toward the seat 153 by a compression spring 155.

Figure 26:
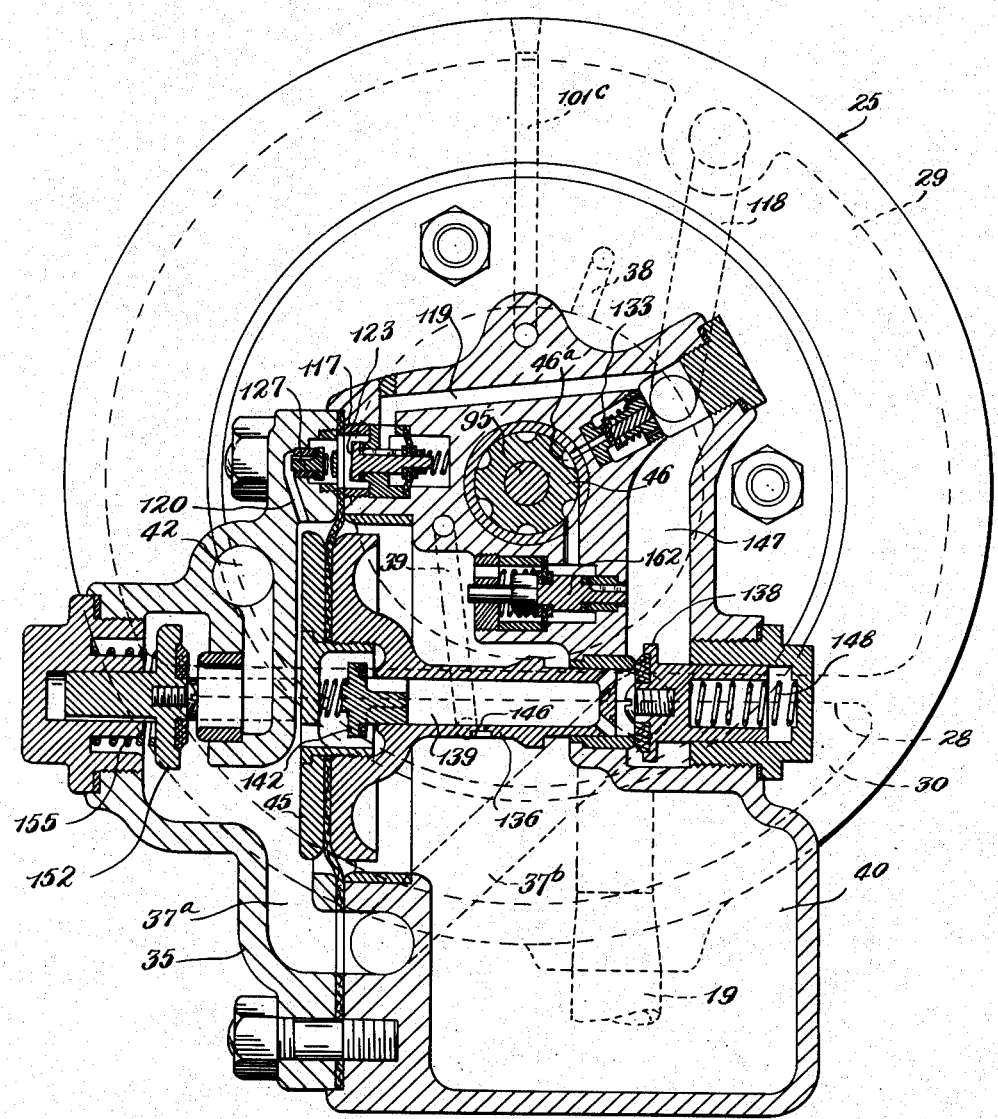
Fig. 26 is a sectional view similar to Fig. 2 but showing the emergency piston and adjacent valve in emergency position.

The valve member 152 is adapted to be opened by motion transmitted thereto from the emergency piston 45 during shifting of the latter toward the left, as seen in Fig. 26. This actuating movement is transmitted to the valve member 152 by means of the push pins 156 which extend through the valve body portion 154 on opposite sides of the passage 42 and engage the valve member on opposite sides of the valve packing 157. From the construction just described for the emergency vent valve 152, it will be seen that this valve is a self-closing valve but is adapted to be opened by positive movement transmitted thereto from the emergency piston 45. The push pins 156 are preferably of a length such that a clearance space 158 is provided between these pins and the emergency piston 45.

In connection with the emergency application of the brake which will be described in greater detail hereinafter, it is desirable to discharge pressure from the supply reservoir 11 into the auxiliary reservoir 29 and the application chamber 30 so as to accelerate the brake applying action and produce a substantially greater braking force. For the accomplishment of this function an equalizing passage is provided which is formed by passage portions 159 and 160 (see Figs. 2 and 16) which connects the supply reservoir discharge passage 147 with one of the grooves 46a of the service piston stem 46. This equalizing passage also includes a valve chamber 161 and is controlled by an equalizing valve member 162 located in this chamber. A bushing 163 mounted in the passage portion 159 forms a valve seat with which the valve member 162 cooperates.

This equalizing valve also includes a diaphragm 164 which forms one wall of the valve chamber 161 and is connected with the valve member 162 by means of the clamping nut 165. The outer end of the valve chamber is closed by a screw plug 166 having an opening 166a therein which admits pressure to the other side of the diaphragm 164 from the release control chamber 40. The valve member 162 has a stem portion 162a which is guided in a central opening of the plug 166 and this valve member is normally urged toward its closed position against the seat 163 by a compression spring 167.

With the construction just described for this equalizing valve device it will be seen that the diaphragm 164 is subjected to pressure on one side thereof by the fluid of the release control chamber 40 which assists the spring 167 in normally holding the valve member 162 in its closed position and is subjected to the action of auxiliary reservoir pressure on its other side which acts in opposition to the spring and shifts the valve member to its open position when the pressure of the release control chamber has been decreased a predetermined amount below auxiliary reservoir pressure. The resistance of the spring 167 and the areas of the diaphragm 164 are such that the valve member 162 will remain closed during service applications of the brake but when an emergency application is made the fall of pressure in the release chamber 40 will be such that the valve member will be opened and supply reservoir pressure will be discharged through the passage 160 to the auxiliary reservoir and this pressure discharge will continue until the supply reservoir pressure and the auxiliary reservoir pressure are substantially equalized.

Attention will now be directed to the control valve section 27 of the mechanism 10 which contains a portion of the load responsive means, as mentioned above, and also contains relay valve means for controlling the supply of pressure fluid from the supply reservoir 11 to the brake cylinder 12. As shown in Fig. 4 of the drawings, the section in which these devices are located includes a housing member 170 having a piston chamber 171 and a relay valve chamber 172 therein. The valve chamber 172 is formed in part by a cover member 173 which is attached to the housing member 170 and which valve chamber includes upper and lower chamber portions or compartments 172a and 172b and an intermediate compartment 172c. The piston chamber 171 is disposed in an adjacent side-by-side relation to the valve chamber 172 and likewise includes upper and lower chamber portions or compartments 171a and 171b.

The upper compartment 171a of the piston chamber 171 is in permanently open communication with the atmosphere through a passage 174 and the upper compartment 172a of the valve chamber 172 is also in permanently open communication with the atmosphere through a passage 175. The lower compartment 171b of the piston chamber 171 is permanently in communication with the application chamber 30 through a passage 176 so that this compartment is, in effect, a portion of the application chamber and can be referred to as such. The intermediate compartment 172c of the valve chamber 172 is permanently in communication with the brake cylinder 12 through the passage 177 and the pipe 22. The lower compartment 172b of the valve chamber is permanently connected with the supply reservoir 11 by means of the passages 178 and 179 and the pipe 21. The intermediate compartment 172c of the valve chamber 172 also has a passage 180 extending therefrom and which leads to the atmosphere through the pipe 24 and the manually actuated retaining valve 14 (see Fig. 1).

A piston 182 disposed in the piston chamber 171 divides this chamber into the above mentioned upper and lower compartments 171a and 171b. This piston is preferably of the diaphragm type having a body portion 182a which cooperates with a sealing diaphragm 183. A piston rod 184 is connected with the piston body 182a and is slidably guided in a bushing 185 mounted in a wall portion 170a of the housing member 170.

A valve actuating member, preferably in the form of the piston 187, is disposed in the valve chamber 172 and divides the upper portion of this chamber into the upper and intermediate compartments 172a and 172c. The piston 187 has a body portion 187a which is connected with a sealing diaphragm 188 and with a piston rod 189 which extends through the wall portion 170a and is slidably guided in a bushing 190 of the latter.

From the arrangement just described for the chambers 171 and 172 and the pistons 182 and 187, it will be seen that the rods 184 and 189 connected with these pistons are movable along substantially parallel paths. The upper ends of these piston rods are connected by a beam or lever 192 extending therebetween. One end of this lever is pivotally connected with the piston rod 184 by means of the pin 193 and its other end is provided with a slot 194 and is pivotally connected with the upper end of the piston rod 189 by means of a pin 195 extending through such slot. The intermediate portion of the lever 192 rockably engages a fulcrum element which is preferably in the form of a roller 196 and to which further reference will presently be made.

Reverting to the valve chamber 172 of Fig. 4 it will be observed that a wall portion 170b cooperates with the piston 187 in defining the intermediate compartment 172c and cooperates with the cover member 173 in defining the lower compartment 172b. The wall portion 170b also forms a seat for a compression spring 197 which acts against the underside of the piston 187. A similar compression spring 198 acts against the underside of the piston 182. The springs 197 and 198 serve to support and balance the pistons 187 and 182 and also cause the lever 192 to be held in engagement with the fulcrum roller 196.

The wall portion 170b has valve passages 200 and 201 extending therethrough and which connect the intermediate valve chamber compartment 172c with the lower compartment 172b. A check valve member 202 controls the passage 200 and a second or supplementary check valve member 203 controls the passage 201. A bushing 204 mounted in the wall portion 170b and surrounding the passage 200 provides a valve seat with which the valve member 202 cooperates and against which this valve member is normally held in seating engagement by a compression spring 205. A bushing 206 also mounted in the wall portion 170b in surrounding relation to the passage 201 provides a seat for the valve member 203 and against which this valve member is normally held by a compression spring 207.

The valve device formed by the valve member 202 and the valve seat 204 can also be referred to as an inlet valve because it controls the delivery of pressure fluid from the supply reservoir 11 to the brake cylinder 12, the path of the fluid being from the lower valve chamber compartment 172b through the valve passage 200 into the intermediate valve chamber compartment 172c and then to the brake cylinder through the passage 177 and the pipe 22. The valve member 202 is shifted to its open position by downward movement of the valve actuating piston 187 and, for this purpose, the valve member has a stem portion 202a which extends through the wall portion 170b into the intermediate valve chamber compartment 172c and is adapted to be engaged by the body 187a of the piston or by the head of the screw 187b carried thereby.

When an emergency application of the brake has been made and is followed by an equalization of the pressure of the supply reservoir 11 with the auxiliary reservoir 29 and the application chamber 30 past the equalizing valve 162, as explained above, the fluid then contained in the brake cylinder 12 will equalize substantially with the relatively high supply reservoir pressure unless such equalization is prevented by the pressure limiting valve 18 which is to be described hereinafter. This equalization of pressures will provide for a relatively high working pressure in the brake cylinder and will result in the development of a high braking force during the emergency application. During the release of the brake after such an emergency application, supply reservoir fluid is discharged into the train pipe to create a brake-releasing impulse wave, as is explained more fully hereinafter, and this causes the pressure in the supply reservoir to drop to a value below the pressure in the brake cylinder. It is desirable to return a portion of this excess pressure of the brake cylinder 12 to the supply reservoir at this time for the purpose of partially recharging the latter and thus conserving the available air pressure. This pressure fluid returns from the brake cylinder 12 to the intermediate valve chamber compartment 172c through the pipe 22 and passage 177 and then passes into the lower valve chamber compartment 172b by causing a downward opening of the check valve members 202 and 203. In accomplishing this return of pressure fluid to the supply reservoir from the brake cylinder, the check valve 203 supplements the check valve 202 and permits this action to take place with a substantially instantaneous rapidity.

During release of the brake following a service application, the motive fluid is exhausted from the brake cylinder 12 preferably by being discharged to atmosphere. This is accomplished through an exhaust valve device 209 which controls the exhaust passage 180. As shown in Figs. 4 and 18, the exhaust valve 209 comprises a valve member 210 and a valve seat 211 with which the valve member cooperates. The valve member 210 has one or more grooves 210a therein through which the fluid passes when this member is disengaged from the seat 211. This valve device also includes a hollow axially extending cage 212 whose lower end is connected with the valve member 210 by welding or other suitable means.

An actuating stem 213 for the exhaust valve device 209 is connected with the piston 187 and extends into the cage 212 through an opening in the upper end wall 212a thereof. The stem 213 has a head 213a thereon disposed inside the cage and this stem is of a length such that the head thereof cooperates with the upper end wall 212a of the cage in forming a lost-motion actuating connection between the valve member 210 and the piston 187. A compression spring 214 located in the cage 212 acts against the valve member 210 and urges the same in a downward direction toward the seat 211 so as to take up lost motion between the end wall 212a and the head 213a.

With the construction just described for the exhaust valve device 209 it will be seen that the valve member 210 will be lifted by the piston 187 to open the exhaust passage 180 but, because of the lost-motion connection between the cage 212 and stem 213, this opening of the exhaust valve will be delayed so as to afford the check valve members 202 and 203 an opportunity to return pressure fluid from the brake cylinder 12 to the supply reservoir 11. The check valve function just described for the valve members 202 and 203 usually takes place only after an emergency application of the brake, although it may occur also after a service application. When the valve member 210 of the exhaust valve device 209 is ultimately lifted by the piston 187, the remaining fluid of the brake cylinder is exhausted to the atmosphere through the passage 180, the pipe 24 and the retaining valve 14.

Reverting now to the load responsive means and the fulcrum element 196 forming a part thereof, it will be seen from Figs. 4 and 10 that the fulcrum roller is located in a recess 216 of a carrier 217 and is mounted on a pin 218 which extends transversely of the recess. The carrier 217 is located above or opposite to the lever 192 and is movable in a direction transversely to the axes of the piston rods 184 and 189 so as to shift the fulcrum roller for cooperation with different points of the intermediate portion of the lever. The carrier 217 can be shifted in one direction by means of a piston 219 located in a hydraulic cylinder 220 which is carried by the housing member 170 and can be shifted in the opposite direction by means of a compression spring 221.

The carrier 217 is slidable in a guideway 222 which is provided in a backing member 223 carried by the housing member 170 and is held firmly against this backing member by the piston springs 197 and 198 so as to eliminate looseness or chattering at this point. During service and emergency applications of the brake, the fluid pressures acting on the underside of the pistons 182 and 187 causes the carrier 217 to be pressed against the backing member 223 with a much greater force which will effectively clamp the carrier in the position of adjustment to which it has been shifted. The carrier 217 is also supported and guided by being connected with the outer end of the piston rod 224 of the hydraulic piston 219 and by means of a guide rod 225 which is welded or otherwise connected to the other end of the carrier and slidably extends through an opening 226 of a lug 227 carried by the housing member 170.

The connection of the carrier 217 with the piston rod 224 can be made by means of the tapered pin 228. The compression spring 221 which shifts the carrier in opposition to the piston 219 is disposed around the guide rod 225 and seats against the lug 227. If desired, dust, rain and other foreign matter can be excluded from the fulcrum mechanism just described by means of a suitable cover 229 which can be made from sheet metal or the like and which is of a suitable shape to extend over the fulcrum mechanism and is connected with the housing member 170 by means of the screws 230.

The piston 219 of the hydraulic cylinder 220 cooperates with a diaphragm 231 which divides this cylinder into compartments 220a and 220b. The compartment 220a is a pressure compartment to which oil or other suitable fluid under hydraulic pressure is supplied through the conduit 32. The compartment 220b is a relief compartment which is permanently in communication with the atmosphere through the vent passage 233. Movement of the piston 219 in the cylinder 220 in response to changes in the hydraulic pressure in the compartment 220a results in shifting of the fulcrum roller 196. When the pressure in the compartment 220a is increased the roller is shifted toward the right, as seen in Fig. 4, against the action of the spring 221 and when the pressure in this compartment is decreased the spring shifts the piston and fulcrum roller toward the left. The fulcrum roller 196 is thus located at different points along the lever 192 in accordance with pressure variations in the compartment 220a, the full line position of the roller shown in Fig. 4 being the position corresponding with a loaded condition of a railway car equipped with the improved brake mechanism and the broken line position being the position corresponding with an empty condition of the car.

The hydraulic pressure for actuating the piston 219 is supplied to the cylinder 220 by the above mentioned hydraulic pressure generating device 17 which is located on one of the trucks of the car. As shown in Fig. 5 this hydraulic pressure generating device comprises a housing 235 which is mounted on the bolster 16 and contains a working chamber or cylinder 236. The chamber 236 is divided into upper, lower and intermediate compartments 236a, 236b and 236c by a pair of upper and lower diaphragms 237 and 238 extending across this chamber. The upper compartment 236a is a spring compartment which is in permanently open communication with the atmosphere through the vent passage 239. This chamber contains a backing spring 240 which acts on the upper side of the diaphragm 237 through a piston member 241. The intermediate compartment 236 is a pressure compartment whose walls are formed in part by the upper and lower diaphragms 237 and 238 and which is connected with the pressure compartment 220a of the fulcrum shifting cylinder 220 by the conduit 32.

The lower compartment 236b is a dash pot compartment, the lower portion of which embodies one or more dash pot cylinders 242 containing suitable dash pot liquid. A piston member 243 is in the lower compartment 236b and engages the lower diaphragm 238. This piston member is connected with a piston rod 244 which slidably extends into the housing 235 through the bushing 245 thereof. The lower end of this piston rod extends through an opening of a support, or bracket 246 which constitutes a portion of the truck of the car relative to which the bolster 16 and the housing 235 are movable during changes in the load of the car. A compression spring 247 disposed around the piston rod 244 seats against the support 246 and also engages a collar or shoulder 247a which is carried by the piston rod so as to transmit thrust to the piston member 243 in response to such relative movement between the housing 235 and the support.

When the load in the car is increased the housing 235 moves downwardly relative to the piston 243 thereby subjecting the liquid in the compartment 236c to pressure and causing some of the liquid to be displaced through the conduit 32 into the compartment 220a of the fulcrum shifting cylinder 220. Conversely, when the load in the car is decreased the housing 235 rises relative to the piston member 243 and permits liquid to be returned to the compartment 236c from the compartment 220a by the action of the compression spring 221.

The effects of vibratory relative movement between the housing 235 and the piston member 243 are dampened or eliminated by means of the dash-pot plungers 248 which are connected with the piston member 243 and operate in the dash-pot cylinders 242. The effects of such vibratory relative movement are further dampened or eliminated by means of a restricted connection or orifice 250 located in the conduit connecting the pressure compartments 220a and 236c, such as in the bolster 16 at the point where this conduit communicates with the compartment 236c. The dash-pot plungers 248 and the restriction 250 effectively prevent minor hydraulic pressure variations from being transmitted to the pressure compartment 220a.

The pressure limiting valve 18, which was mentioned near the beginning of this specification as being located in the pipe line 22 leading to the brake cylinder 12, is shown in Fig. 6 as comprising a housing 255 and a valve member 256 movable in the housing. The housing 255 has inlet and outlet chambers 257 and 258, of which the inlet chamber is supplied with pressure fluid by the passage or pipe connection 22a and the outlet chamber is connected with the brake cylinder by the passage or pipe connection 22b. The inlet and outlet chambers 257 and 258 are connected by a valve passage 259 which is surrounded by a valve seat 260.

The valve member 256 cooperates with the valve seat 260 and is carried by a movable valve stem 261. One end of this valve stem has a head 261a which engages or is connected with a diaphragm 262 and acts against a compression spring 263 which is located on the opposite side of the diaphragm. One end of the compression spring 263 engages the diaphragm by means of a spring seat 264 and the other end of the spring engages a spring seat 265 which is here shown as being in the form of a screw plug. This plug engages in a threaded opening of the housing portion 255a and is adjustable therein for varying the compression of the spring 263.

The other end of the valve stem 261 has a guide projection 261a thereon which is slidable in a bushing 266 which is suitably mounted in the housing 255 and, in this instance, is carried by a removable screw plug 267. A compression spring 268 is disposed around the bushing 266 and acts on the valve member 256 in a direction to hold the head of the valve stem 261 against the diaphragm 262.

When pressure fluid is supplied to the brake cylinder at a relatively high unit pressure, such as during an emergency application of the brake, the pressure fluid acts on the diaphragm 262, shifting the same in opposition to the spring 263 and thereby permitting the spring 268 to cause closing of the valve member 256 relative to the valve seat 260. This closing of the valve member 256 cuts off the supply of pressure fluid to the brake cylinder 12 and thereby automatically limits the pressure fluid to a predetermined desired value for producing a safe emergency application of the brake. Although the limiting valve device 18 is desirable in an air brake apparatus of this character, it can however be omitted. It should also be understood that although this limiting valve is here shown as being located in the pipe line 22, it could, if desired, be located at a suitable point in the control valve mechanism 10.

Operation of the improved air brake apparatus

The operation of the improved air brake apparatus herein disclosed will now be described and the functioning thereof will be explained with reference to different positions which the pistons and various valve devices assume under different conditions. Many of these different positions are illustrated in the drawings, of which certain views can be regarded as diagrammatic views for illustrating these positions.

Initial charging position

The relative positions of the parts contained in the control valve section 26 of control mechanism or unit 10 for the initial charging of the supply and auxiliary reservoirs 11 and 29 are illustrated in Figs. 2 and 3. Air pressure is delivered into the train pipe 13 from the locomotive and the control mechanism 10 of each car of the train is supplied with fluid pressure from the train pipe through its individual branch pipe connection 19. The pressure fluid thus supplied to the control mechanism 10 enters the inlet chamber 37, including the extension chamber portion 37a thereof, and passes from this chamber through the strainer 50 into the compartment 34a of the service piston chamber 34. In the event that the strainer 50 should be clogged with dirt, the pressure fluid will pass into the compartment 34a through the strainer bypass valve 51, as explained above.

From the compartment 34a the pressure fluid flows through the feed passage 64 of the service piston 44 and then through the charging valve device 69 into the compartment 34b of the service piston chamber. From the compartment 34b the pressure fluid flows directly into the auxiliary reservoir 29 through the passage 38 and charges the auxiliary reservoir to the desired value. From the compartment 34b the pressure fluid also flows directly into the auxiliary reservoir chamber portion 29a through the grooves 46a of the service piston stem 46.

While this initial charging is taking place, the service piston 44 occupies substantially the position illustrated in Fig. 3 and, at this time, the valve member 63 of the charging valve 60 is held in its open position, as shown in Fig. 8, affording the maximum extent of opening for the valve passage 69 for the flow of pressure fluid into the compartment 34b. At this time the passage 87, which connects the auxiliary reservoir chamber 29a with the portion 30a of the application chamber 30, is closed by the valve member 89 and the position of the service piston 44 is such that the valve member 105 of the release valve device 102 will be in its open position by reason of the fact that the plunger 106 is then being held in a lifted position by the cam 108 of the piston stem 46. The open position of the valve member 105 causes the application chamber 30, 30a to be vented to the atmosphere through the passages 101a, 101b and 101c. During the initial charging of the reservoirs, the service vent valve 77 is held in its closed position in engagement with the seat 75 by the compression spring 79. Likewise, the emergency vent valve 152 will be held in closed position against its seat 153 by the spring 155.

The charging of the supply reservoir 11 initially takes place as a quick charging action through the quick charging valve device 117 described above. When the pressure in the supply reservoir builds up to approximately 50 p. s. i. through this quick charging action, the valve member 123 of the quick charging valve 117 closes automatically, as explained above. Simultaneously with the initial quick charging of the supply reservoir through the valve 117, pressure fluid is also being supplied to the supply reservoir through the normal charging valve 130 and the supply through the latter valve continues after the quick charging valve closes. When the supply reservoir pressure reaches its desired final value, the normal charging valve 130 also closes.

During the initial charging operation, the pressure in the release control chamber 40 will be below the pressure in the inlet chamber 37, 37a and the emergency piston 45 will be held in a position displaced toward the right, as shown in Fig. 2, by the inlet chamber pressure. While it is in this position the emergency piston 45 holds the supply reservoir discharge valve 138 in the open position shown in Fig. 2, but the only effect resulting therefrom at this time is that the release control chamber is charged with pressure from the supply reservoir 11 through the passage 147, the passage 139 and the restriction 146. As the pressure in the release control chamber 40 builds up and equalizes with the pressure in the inlet chamber 37, 37a, the compression spring 148 acting on the piston stem 136 through the valve member 138 will shift the emergency piston 45 to substantially the position shown in Fig. 21, thereby permitting the valve member 138 to close against the seat 137a and cut off communication between the supply reservoir and the release control chamber. Because of the function which the valve member 138 performs in assuring the release of the brake, as will be explained hereinafter, this valve member may also be referred to as a release assuring valve.

In connection with the charging of the supply reservoir 11, it should be explained at this point that in this improved air brake apparatus all of the valves controlling the passages to the supply reservoir are self-closing valves which act to trap the pressure fluid in the supply reservoir. This is an important feature because when a car is left standing on a siding and the supply of pressure fluid in the brake pipe and auxiliary reservoir become depleted through leakage, substantially the full charge of pressure fluid will still be retained in the supply reservoir and when a locomotive is subsequently connected with the car it will only be necessary to recharge the train pipe and the auxiliary reservoir. A substantial saving in time and in the supply of pressure fluid will thus be effected.

It will be understood, of course, that during the initial charging operation the valve member 202 which controls the supply of pressure fluid from the supply reservoir 11 to the brake cylinder 12 will remain closed.

Quick service position

When a service application of the brake is to be made and a reduction in train pipe pressure is started by the discharge of pressure fluid therefrom through the engineer's control valve, the service piston 44 first moves toward the right a predetermined distance, represented by the dimension or space X in Fig. 3, and this movement of the piston occurs without valve or spring interference. This initial shifting of the service piston results in a partial closing of the charging valve 60 so as to restrict the charging passage 69 of the valve member 63 and also results in the space X between the thrust member 81 and the service vent valve pin 80 being taken up.

The effective area of the vent valve 77 and the pressure of the spring 79 are such as to resist further shifting of the service piston 44 with a force sufficient to stabilize the quick service condition at this point, so that thereafter a predetermined differential between train pipe pressure and auxiliary reservoir pressure will be required to complete the unseating of the vent valve 77 by the thrust member 81. This results in the control mechanism 10 being placed in a condition of readiness for completing the service application of the brake without being subject to any undesired quick service activity, such as might otherwise be produced by minor or moderate fluctuations in train pipe pressure resulting from leakage or other causes.

Figure 21:
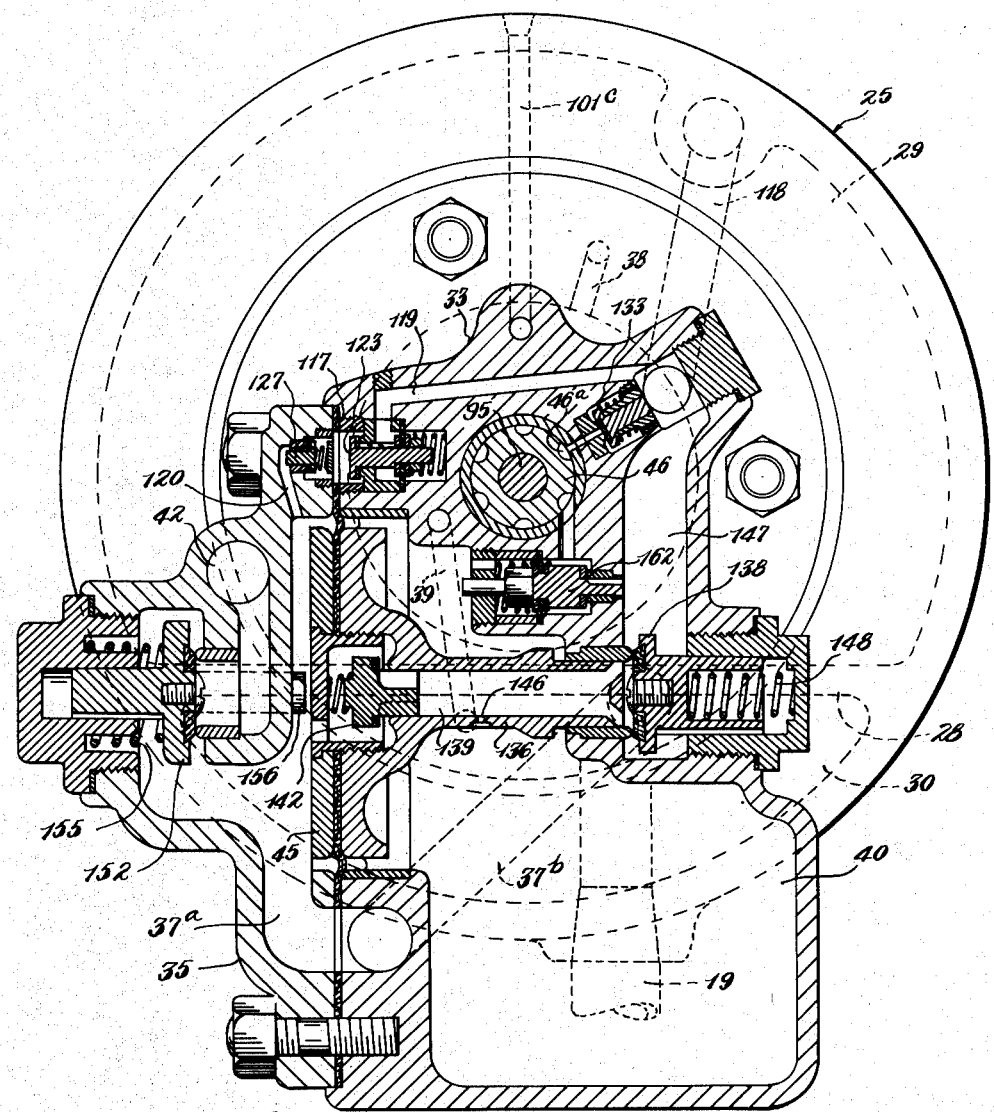
Fig. 21 is a sectional view similar to Fig. 2 but showing the emergency piston and adjacent valve means in quick service position.
Figure 15:
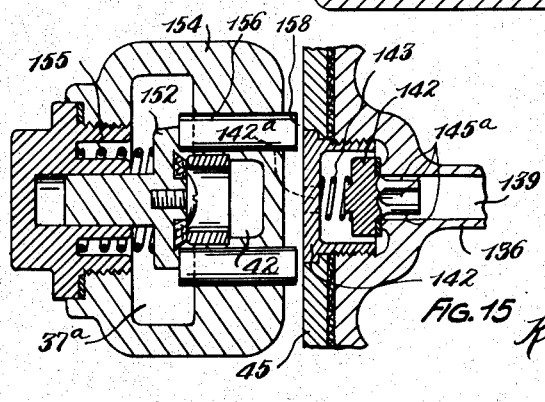
Fig. 15 is a partial sectional plan view taken on line 15—15 of Fig. 2 and further illustrating the emergency vent valve and the emergency piston check valve.

As the train pipe pressure reduction continues, the pressure differential between the train pipe and the auxiliary reservoir 29 reaches a value such as to cause the service piston 44 to shift further toward the right thereby unseating the service vent valve 77, as shown in Figs. 19 and 20. The unseating of this vent valve opens the vent passage 41 to atmosphere and results in a local venting of the train pipe pressure to atmosphere from the control mechanism 10 of each car of the train. As the service piston 44 is shifted toward the right to accomplish this unseating of the vent valve 77, the cam 108 carried by the piston stem 46 moves away from the plunger 106 and permits release valve member 105 to be moved toward its closed position by auxiliary reservoir pressure acting on top of the diaphragm 109. The closing of the release valve member 105 cuts off communication between the application chamber 30, 30a and the atmosphere. In the drawings, Figs. 19 and 21 show the relative positions of the parts of the control valve section 26 of the mechanism 10 at substantially the time when the quick service condition has been fully established. At this time the end of the thrust member 81 is at the point of being disengaged from the pin 80 to permit reclosing of the service vent valve 77.

During the establishment of the quick service condition as just explained above, the pressure in the train pipe falls below the pressure existing in the release control chamber 40 and this results in pressure fluid being discharged from the release control chamber through restricted passage 146, the passage 139 of the emergency piston stem and past the check valve member 142 which is shifted to its open position at this time, as shown in Fig. 21. The discharge of pressure from the release control chamber 40 into the inlet chamber 37, 37a thus eliminates any substantial pressure differential which would otherwise cause shifting of the emergency piston 45 and result in an undesired emergency application of the brake.

Service position

Figure 22:
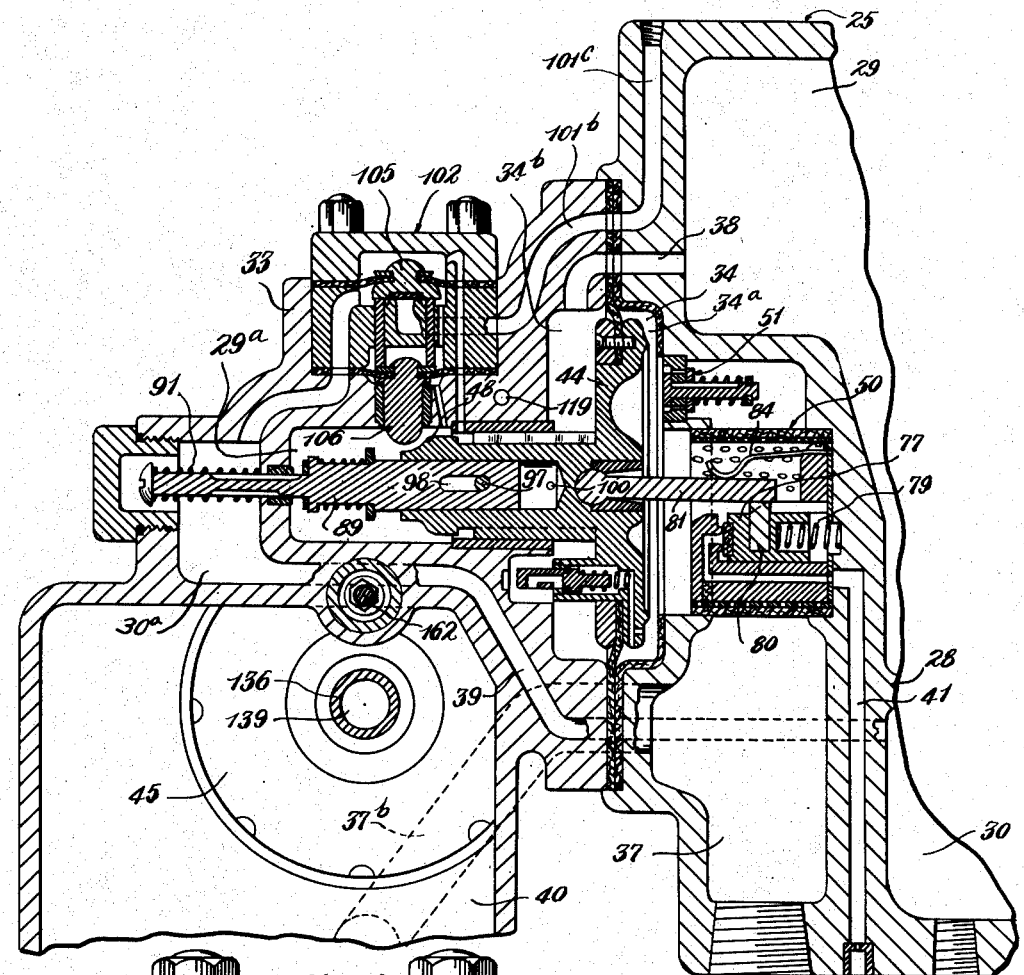
Fig. 22 is a sectional view similar to Fig. 3 but showing the service piston and adjacent valve means in service position.

Following the establishment of the above described quick service condition, the train pipe pressure is further reduced through the engineer's control valve to produce the desired service application of the brake. This causes the service piston 44 to be shifted further to the right to substantially the position shown in Fig. 22 and in so doing the piston stem 46 imparts movement to the valve member 89 by means of the pin 97. This shifting of the valve member 89 causes the longer valve groove 94 thereof to be shifted to its open position in which it provides a passage connecting the auxiliary reservoir chamber portion 29a with the application chamber portion 30a. Pressure fluid is thereupon supplied to the application chamber 30 from the auxiliary reservoir 29 and the pressure in the application chamber acts on the underside of the piston 182 (see Fig. 32) causing an upward movement of this piston and a corresponding downward movement of the valve actuating piston 187. The downward movement of the piston 187 imparts opening movement to the valve member 202 which controls the passage connecting the brake cylinder 12 with the supply reservoir 11. The opening of the valve member 202 permits pressure fluid to flow from the supply reservoir 11 through the passages 179 and 178 and then through the lower valve chamber compartment 172b into the intermediate valve chamber compartment 172c. From the intermediate compartment 172c the fluid then passes to the brake cylinder 12 through the passage 177 and the pipe 22. The pressure fluid thus supplied to the brake cylinder 12 acts on the piston therein and causes a service application of the brake.

It should be explained at this point that the pressure of the fluid thus supplied to the brake cylinder in p. s. i. is determined by the relationship between the fixed volume of the application chamber and the fixed volume of the auxiliary reservoir and through which volume relationship a definite pressure value is obtained in the lower compartment 171b to act on the underside of the piston 182. The result of this relationship is that the amount of opening movement imparted to the valve member 202 by the piston 187 will be in accordance with the pressure developed in the application chamber and, hence, the pressure of the motive fluid which is supplied to the brake cylinder will be in direct proportion to the pressure in the application chamber. Variations in the length of travel of the brake cylinder piston, or leakage of fluid from the brake cylinder, will have substantially no effect on the pressure value of the fluid supplied to the brake cylinder because the supply reservoir is of relatively large volume and will maintain a pressure in the brake cylinder which will be substantially constant for a given extent of opening of the valve member 202. It will, therefore, be seen that the pressure developed in the brake cylinder will be exactly in proportion to the train pipe pressure reduction and that this will be true regardless of any uneven travel for the brake cylinder piston and regardless of brake cylinder leakage.

Although the pressure developed in the brake cylinder 12 during a service application of the brake is in direct proportion to the train pipe pressure reduction, as explained above, the brake cylinder pressure is also dependent upon the amount of load contained in the car. It is desirable that an increased pressure be developed in the brake cylinder when the car carries a full load and that a lower brake cylinder pressure be developed when the car is empty. As previously explained herein, variations in the amount of load carried by the car cause an automatic shifting of the fulcrum roller 196 and when the fulcrum roller is in the full load position shown in Fig. 4, the piston 187 opens the valve member 202 and causes a higher brake cylinder pressure to be developed than when the fulcrum is in a position corresponding with an empty condition of the car as shown in Fig. 32.

It should also be explained at this point that during either a service or emergency application of the brake, the pistons 182 and 187 will be urged upwardly by the pressures acting on the underside thereof and this will cause the lever 192 to apply a heavy force to the fulcrum roller 196 and the fulcrum carrier 217, causing the latter to be frictionally pressed against the backing member 223. This will effectively lock the fulcrum carrier in its load-adjusted position so that no undesired shifting of the fulcrum roller can take place such as might otherwise cause any erratic action during the application of the brake.

The reduction in train pipe pressure which occurs during a service application of the brake causes this pressure to fall below the pressure of the release control chamber 40 and, as explained above, for the quick service position, pressure fluid is discharged from the release control chamber through the restriction 146, the passage 139 of the emergency piston 45 and past the check valve member 142 into the inlet chamber portion 37a. This results in a substantial equalization between the pressures of the release control chamber and the train pipe and permits the emergency piston 45 to remain substantially in the position shown in Fig. 21.

*Service lap position*

Figure 23:
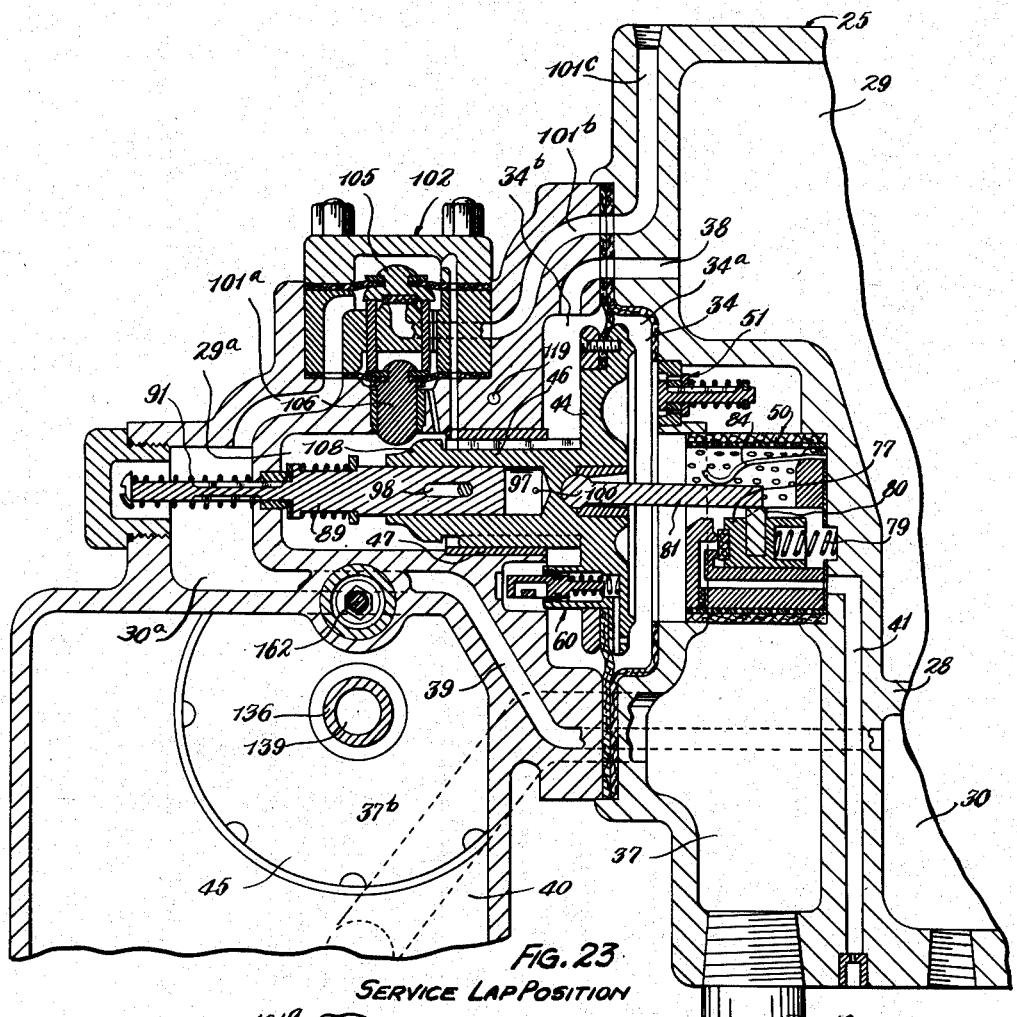
Fig. 23 is a sectional view similar to Fig. 3 but showing the service piston in adjacent valve means in service lap position.

When the train pipe pressure has been reduced by the amount necessary to produce a desired service application of the brake, the pressure of the auxiliary reservoir will be reduced slightly below train pipe pressure by reason of the flow of pressure fluid from the auxiliary reservoir into the application chamber through the groove 94 of the valve member 89, as explained above. The service piston 44 will thereupon move toward the left and this will permit the valve member 89 to be moved by the spring 91 to a position closing the passage between the auxiliary reservoir and the application chamber, as shown in Fig. 23. At this time the cam 108 carried by the piston stem 46 is still disengaged from the plunger 106 so that the release valve 105 still remains in its closed position and prevents venting of the application chamber to the atmosphere. This position of the service piston also prevents the thrust member 81 from being reset in the position necessary to produce reopening of the service vent valve 77. A secondary service application of the brake can therefore be made from this service lap position merely by actuating the engineer's valve to produce a secondary train pipe pressure reduction.

During this service lap condition of the apparatus the pistons 182 and 187 will assume a balanced position such as will permit the valve member 202 to close, but without causing opening of the brake cylinder exhaust valve device 209. That the pistons 182 and 187 will assume such a balanced position is apparent from the fact that application chamber pressure acts continuously on the underside of the piston 182 and, as pressure is admitted to the intermediate valve chamber compartment 172c from the supply reservoir 11 by the opening of the valve member 202, such supply reservoir pressure will act on the underside of the piston 187 and will exert a sufficient lifting force thereon to balance the application chamber pressure acting on the piston 182 in true proportion to the position of the fulcrum 196 on the lever 192, whereupon the valve member 202 will be closed by the spring 205. The pressure fluid supplied to the brake cylinder 12 during the service position will thus be trapped in the brake cylinder for holding the brake in the applied position.

*Release and recharge after service application*

The release of the brake following a service application is produced by increasing the train pipe pressure, as by admitting pressure fluid thereto through the engineer's control valve.

This increase in train pipe pressure will shift the service piston 44 toward the left causing the cam 108 to lift the plunger 106 and open the release valve member 105. The application chamber 30, 30a will thereupon be vented, or partially vented, to atmosphere through the passages 101a, 101b and 101c and the resulting decrease in pressure beneath piston 182 will permit an upward movement of piston 187 which will cause exhaust valve member 210 to be lifted off its seat. This will permit the pressure fluid previously supplied to the brake cylinder 12, or a controlled portion thereof, to be exhausted to atmosphere through exhaust passage 180, pipe 24 and retaining valve 14. The rate of release for the brake and the amount of brake applying pressure which is released is determined by the extent of the venting of the application chamber 30, 30a through the release valve device 102 and by the amount of restriction imposed on the exhaust passage 180 by the retaining valve 14. As is understood by those skilled in the air brake art, the retaining valve 14 can be manually adjusted for maintaining the brake in an applied, or partially applied, setting to suit different operating conditions, such as grade of track, extent of car loading and the like.

Figure 24:
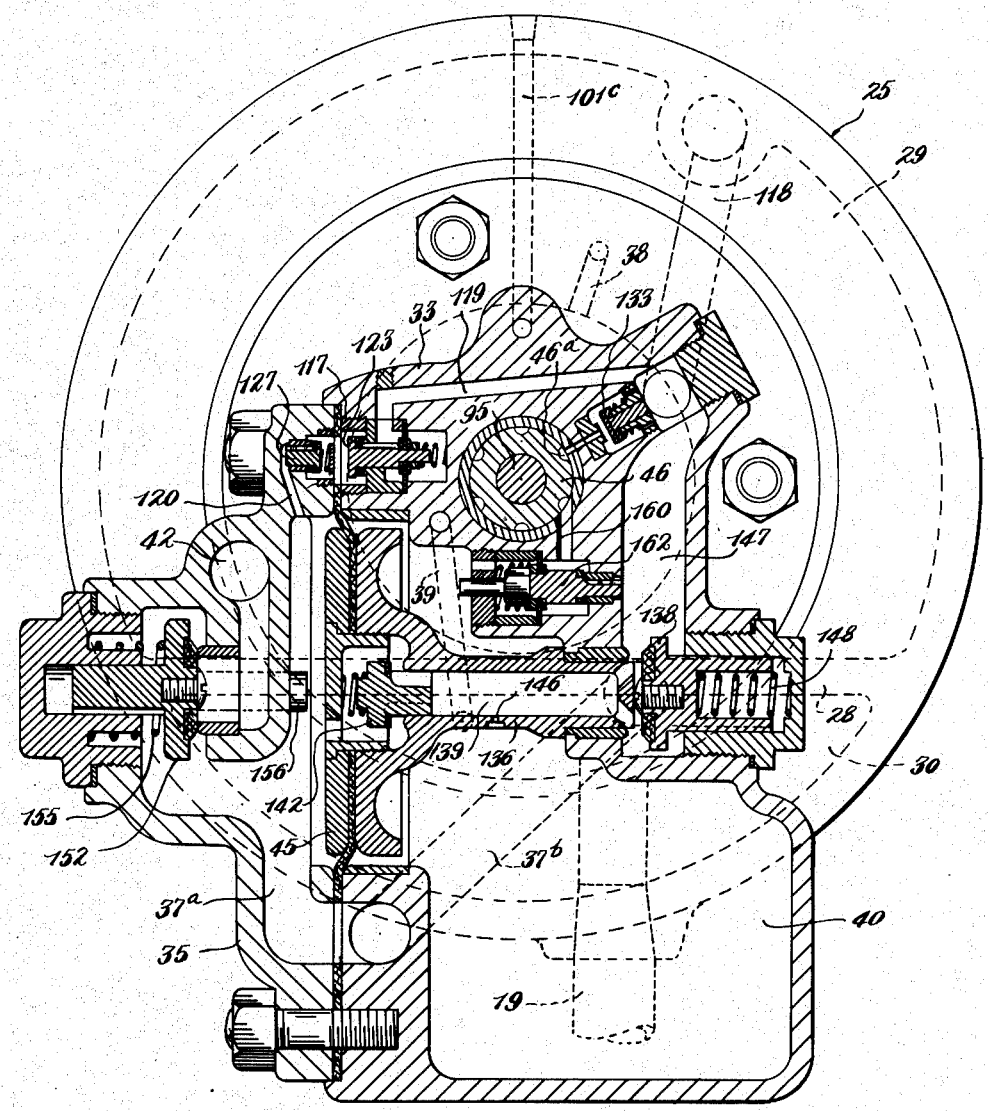
Fig. 24 is a sectional view similar to Fig. 2 but showing the emergency piston and adjacent valve means in position for release and recharge after a service application of the brake.

Since the pressure in the release control chamber 40 has been reduced through the discharge of pressure fluid therefrom past the emergency piston check valve member 142, as explained above, a predetermined increase in the train pipe pressure for producing a full release of the brake will move the emergency piston 45 toward the right and cause unseating of the supply reservoir discharge valve 138 against the action of the spring 148, as shown in Fig. 24. The unseating of this valve will immediately release the high pressure supply reservoir fluid into the train pipe through the hollow stem passage 139 of the emergency piston 45 and past the check valve member 142. The sudden discharge of this high pressure fluid from the supply reservoir into the inlet chamber and the train pipe will immediately shift the service piston 44 to its release position. When this pressure discharge occurs on any given car, the sudden increase thus produced in train pipe pressure will create a brake-releasing impulse wave which will have a similar effect in shifting the service piston to a release position on a number of cars adjacent thereto in both directions of the train.

This novel brake-releasing impulse wave action substantially eliminates the troublesome condition of stuck brakes which heretofore occurred frequently in air brake mechanisms where leakage past the service piston prevented this piston from being shifted to its release position. In the improved brake herein disclosed, such leakage past the service piston during the brake-releasing function is prevented because the charging valve 60 will be in its closed position during the service application of the brake and will remain in such closed position until the service piston is shifted to its release position whereupon the valve member 63 of the charging valve will assume a position corresponding substantially with that shown in Fig. 8. During this brake releasing function above explained, the various parts and valve devices of the control valve mechanism are actuated in a positive manner and are shifted to definite release positions. This enables the mechanism to function uniformly in causing the prompt release of the brake and in recharging the auxiliary and supply reservoirs and also produces an assured condition of readiness for a prompt reapplication of the brake when desired.

Emergency position

Figure 25:
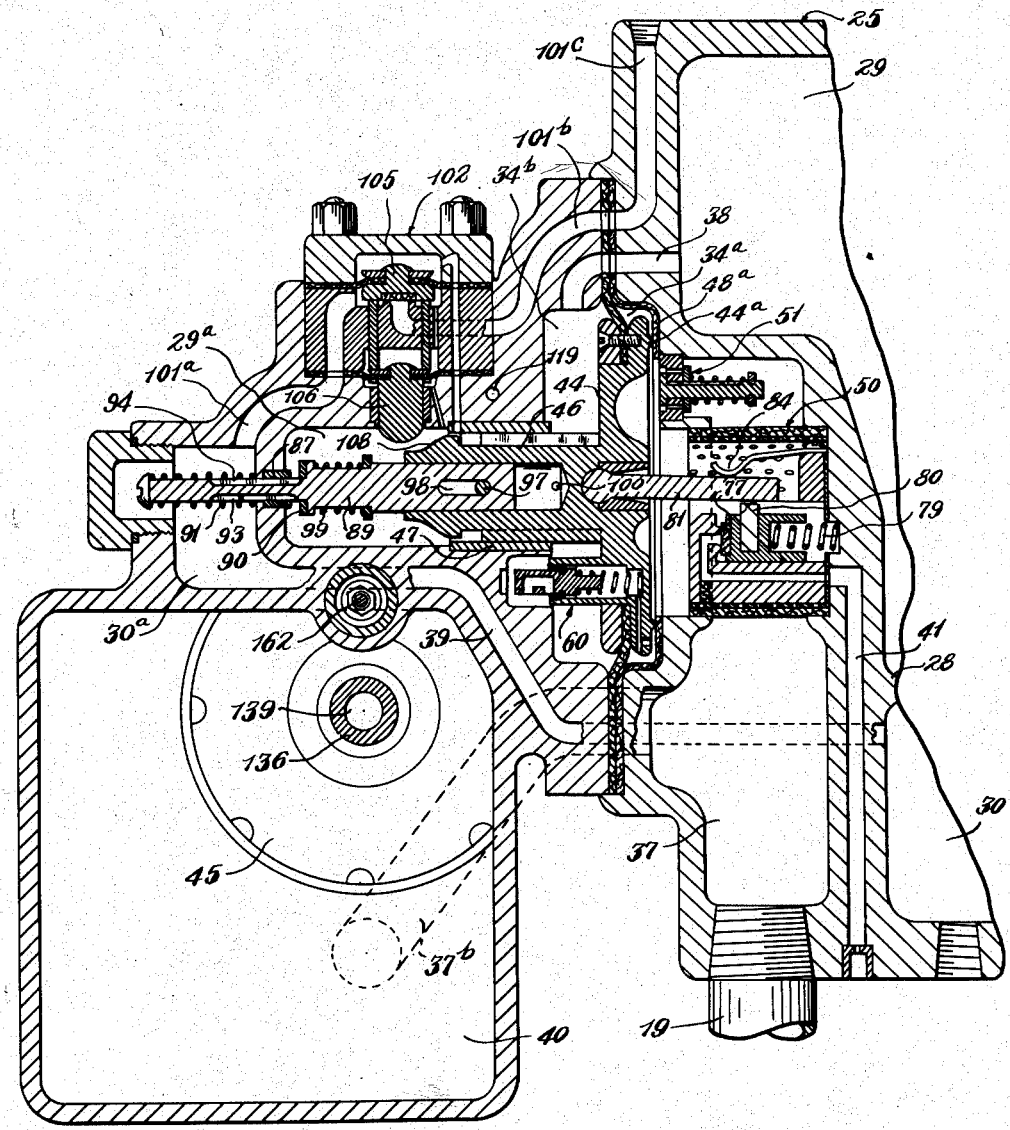
Fig. 25 is a sectional view similar to Fig. 3 but showing the service piston and adjacent valve devices in emergency position.

When an emergency application of the brake is desired and an emergency rate of train pipe pressure reduction has taken place, the pressure in the train pipe and in the inlet chamber 37, 37a quicky falls below the pressure in the release control chamber 40. The restricted passage 146 prevents the pressure in the release control chamber from decreasing at the same rate as the train pipe pressure and this results in a pressure differential being quickly established between opposite sides of the emergency piston 45, causing the latter to be shifted toward the left thereby unseating the emergency vent valve 152 by motion transmitted to the latter through the thrust pins 156 as shown in Fig. 26. In this manner the emergency vent valve 152 on each individual car is opened and a rapid venting of train pipe pressure to the atmosphere through the vent passage 42 takes place. This rapid reduction in train pipe pressure also causes the service piston 44 to quickly move to its emergency position at the extreme right of the service piston chamber 34, as shown in Fig. 25. The shifting of the service piston to this extreme position moves the valve member 89 to its extreme open position shown in Fig. 25 in which both of the grooves 93 and 94 are uncovered and provide a connecting passage of larger area between the auxiliary reservoir and the application chamber. When the service piston is in its emergency position, as shown in Fig. 25, the annular ridge 44a thereon seats against the gasket portion 48a and forms a seal at this point, which insures against leakage of pressure fluid from the auxiliary reservoir back into the train pipe.

Second stage emergency

Figure 27:
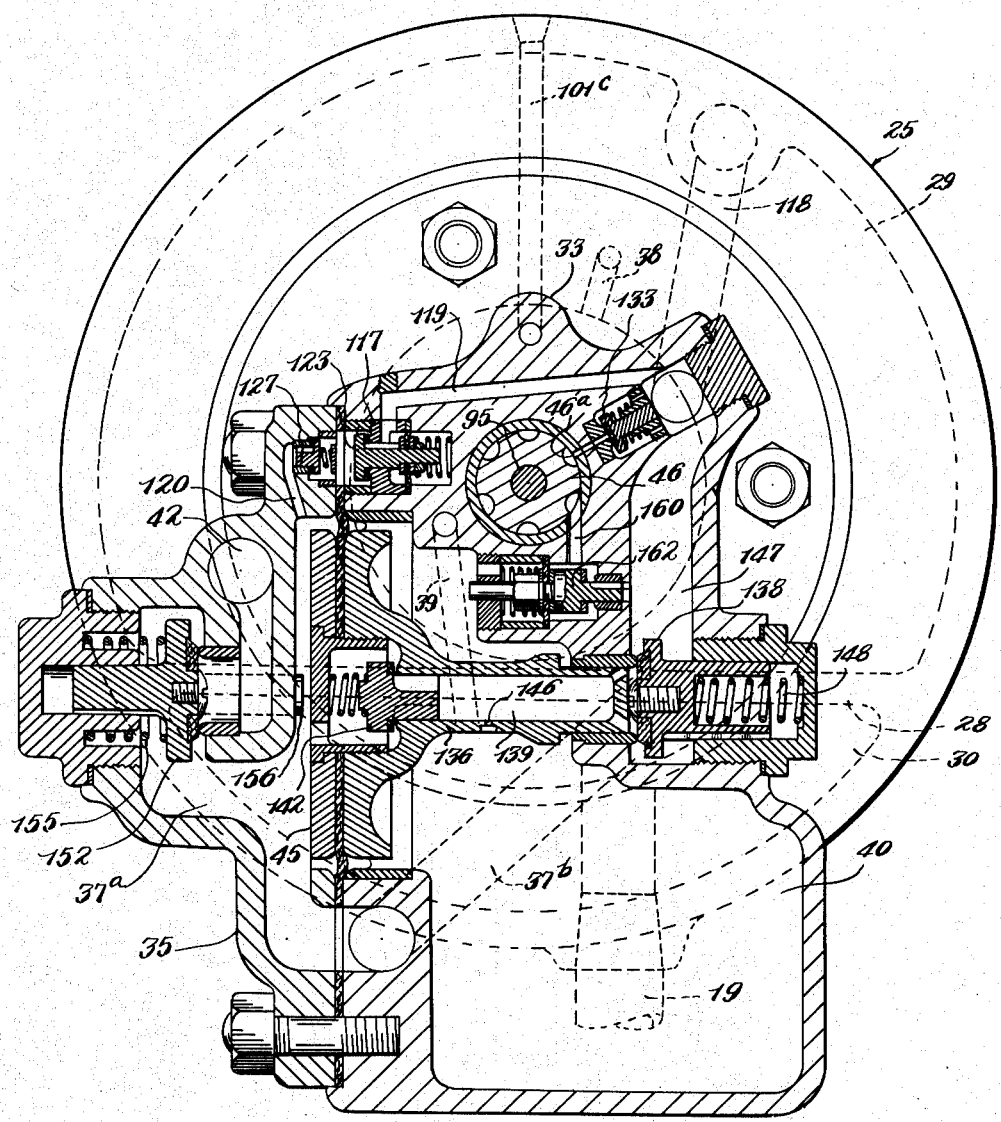
Fig. 27 is a sectional view similar to Fig. 2 but showing the emergency piston and adjacent valve means in second stage emergency position.
Figure 28:
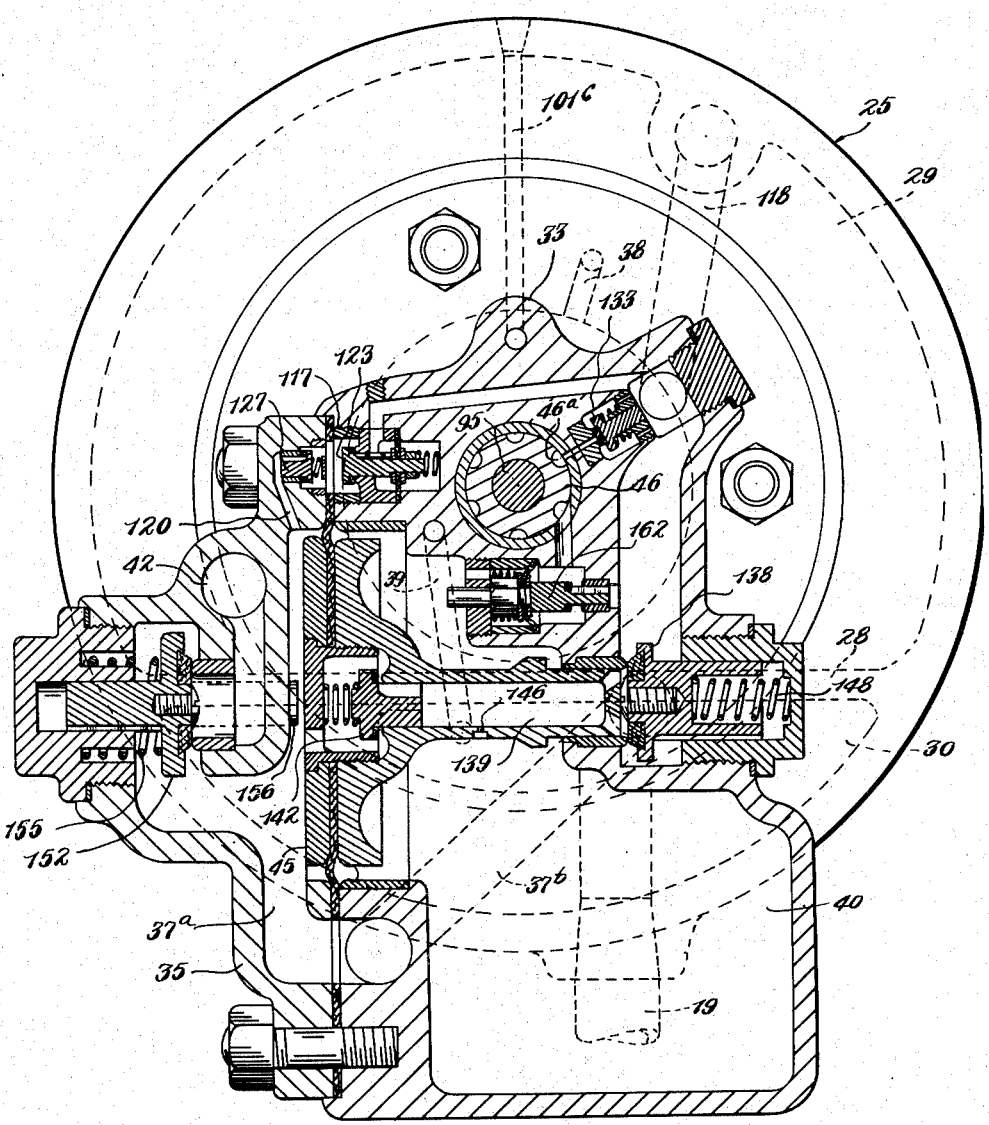
Fig. 28 is a sectional view similar to Fig. 2 but showing the emergency piston and adjacent valve means in emergency lap position.
Figure 16:
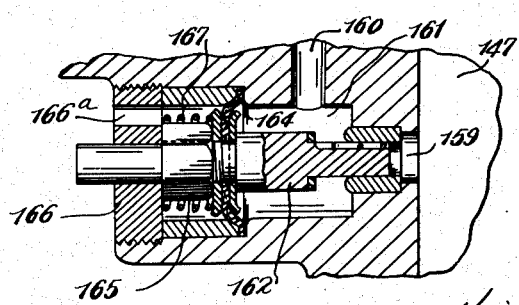
Fig. 16 is a larger scale sectional view of the equalizing valve device of Fig. 2, the valve being shown in its open position.

As soon as the release control chamber pressure drops to a predetermined value, such as about 30 p. s. i., the pressure of the auxiliary reservoir acting on the diaphragm 164 of the equalizing valve 162 will shift this valve member in opposition to the spring 167, thereby opening the valve as shown in Figs. 16 and 27 and permitting high pressure fluid from the supply reservoir 11 to flow through the passage 160 to the auxiliary reservoir and also into the application chamber 30, 30a through the passages 93 and 94 of the valve member 89 which is then in its open position. This results in much higher pressure being supplied to the application chamber than is the case during a service application of the brake and, hence, the piston 182 is quickly shifted upwardly, resulting in a downward movement of the piston 187 and a quick opening of the valve member 202 to the full open position shown in Fig. 32.

The movement of the valve member 202 to its full open position permits the high pressure supply reservoir fluid to be supplied to the brake cylinder to cause the desired emergency braking force to be developed. The opening of the equalizing valve 162, as just explained above, permits supply reservoir pressure, auxiliary reservoir pressure and application chamber pressure to equalize at this time and since this results in a quicker and more effective actuation of the piston 182 and opening of the valve member 202, a higher brake cylinder pressure will be obtained than would be possible in response to a service reduction in brake pipe pressure.

Since the pressure in the release control chamber 40 is never fully exhausted during a service application of the brake, it will be apparent that the shifting of the emergency piston 45 necessary for opening the emergency vent valve 152 can be obtained at any time that an emergency reduction is produced in the train pipe pressure. As soon as the pressure of the release control chamber has been exhausted or equalized with the depleted train pipe pressure condition existing during an emergency application, the spring 155 will close the emergency vent valve 152 and acting through the thrust pins 156 will shift the emergency piston 45 back to its neutral position.

*Release after emergency application*

In releasing the brake after an emergency application, pressure is built up in the train pipe by being supplied thereto from the locomotive until a predetermined pressure value is reached, whereupon the emergency piston 45 will shift toward the right and will overcome the spring 148 to cause opening of the supply reservoir discharge valve 138. The opening of the valve 138 permits supply reservoir pressure to be discharged into the train pipe through the passage 139 of the emergency piston and past the check valve member 142. Supply reservoir pressure will also flow into the release control chamber 40 from the passage 139 through the restricted opening 146 thereby partially charging this chamber. As soon as the pressure in the release control chamber slightly exceeds the pressure in the train pipe, the emergency piston will be returned to its neutral position but as train pipe pressure is gradually increased to the desired maximum value, the emergency piston will again be moved to the right to reopen the valve 138 long enough to permit the release control chamber to be charged up to the pressure of the train pipe and supply reservoir.

At that point in the operation of releasing the brake after an emergency application at which the supply reservoir pressure starts to fall, the brake cylinder pressure will flow back to the supply reservoir through the passage 177, the valve chamber compartments 172c and 172b and through the passages 178 and 179. A portion of this return flow of pressure fluid from the brake cylinder takes place through the passages 200 of the valve member 202 and another portion takes place through the passage 201 which is controlled by the supplemental check valve member 203. This return of high pressure fluid from the brake cylinder following an emergency application serves to partially recharge the supply reservoir 11 and thus conserve pressure fluid.

When the train pipe pressure has been increased and a substantial equalization between train pipe and auxiliary reservoir pressures has taken place, the spring 91 will shift the valve member 89 toward the left to its closed position and as the service piston 44 resumes its release position the cam 108 on the piston stem 46 will lift the plunger 106 and open the release valve 105 for exhausting the application chamber to the atmosphere. The discharge of supply reservoir pressure into the brake pipe at the time of release following service and emergency applications of the brake brings about a much more prompt equalization of train pipe and auxiliary reservoir pressures and a consequent more positive releasing action of the brake than would be possible by increasing train pipe pressure by charging the train pipe from the locomotive alone.

*Retarded recharge*

Figure 30:
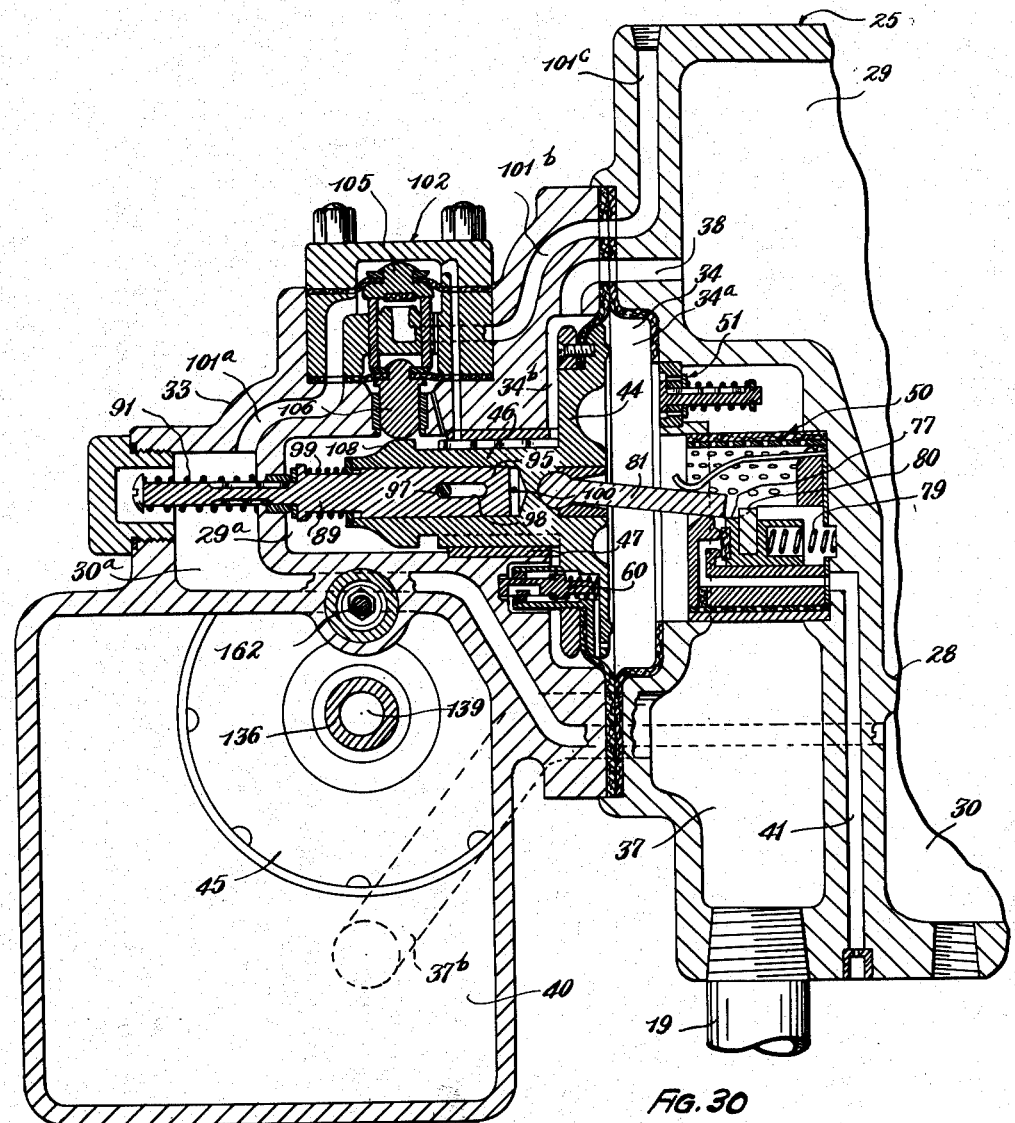
Fig. 30 is a sectional view similar to Fig. 3 but showing the service piston and adjacent valve means in restricted recharged position.

Whenever during the brake releasing action the train pipe pressure is more than a few pounds, such as approximately three pounds higher than auxiliary reservoir pressure, the spring 99 will be compressed by a shifting of the service piston 44 toward the left, as shown in Fig. 30. This results in the charging valve 60 assuming a position as shown in Fig. 31, in which the passage 69 of the valve member 63 is partially closed, thereby restricting the rate at which charging fluid is permitted to flow from the inlet chamber 37 to the auxiliary reservoir 29. This restricted charging position may occur in the valve mechanisms of those cars which are located near the front end of the train although it may occur at any car or cars in the train in response to any high pressure brake-releasing wave in the train pipe. In those valve mechanisms which are located more remotely from the front end of the train, the charging valve 60 may remain in this retarded charging position only momentarily. When the charging valve 60 assumes this retarded charging position it prevents overcharging of the auxiliary reservoir. The charging valve 60 thus provides for a more uniform rate of recharge for all of the auxiliary reservoirs of the cars, and in regard to those cars which are located in the rear portion of the train, it permits a more rapid increase in train pipe pressure and a more positive and reliable release action of the brake.

*Variable load function*

The shifting of the fulcrum roller 196 in response to changes in the loading of the car has already been explained above in connection with Figs. 1, 4 and 5 of the drawings. This variable load function is further illustrated in Figs. 32 to 37 inclusive. In Fig. 32 the fulcrum roller 196 is shown in a position corresponding with an empty condition of the car and the pistons 182 and 187 are shown in their relative positions corresponding with an emergency application of the brake. The piston 187 is shown as having opened the valve member 202 for the supply of high pressure fluid from the supply reservoir 11 to the brake cylinder 12. Fig. 34 corresponds with Fig. 4 in that it shows the fulcrum roller 196 at the full load position but shows the pistons 182 and 187 in the positions corresponding with a releasing action of the brake following an emergency application. In this view the valve member 202 and the supplemental check valve 203 are both shown in the open position in which they permit the return of pressure fluid from the brake cylinder 12 to the supply reservoir 11, as explained above. Fig. 36 shows the fulcrum roller 196 in a position corresponding with an approximately half loaded condition of the car. The pistons 182 and 187 are shown in the positions corresponding with the release of the brake following a service application. In the position here shown for the piston 187, the exhaust valve 210 is being held in its open position by this piston so as to permit the venting of pressure from the brake cylinder to the atmosphere through the vent passage 180, the exhaust pipe 24 and the retaining valve 14.

*Conclusion*

Certain of the advantages of this improved air brake apparatus have already been explained at various points in the foregoing detailed description of the construction and operation of the apparatus. It is considered advisable, however, to summarize the advantages at this point. It will accordingly now be understood from the accompanying drawings and the foregoing description that this invention provides an improved air brake apparatus for use on railway freight cars, and the like, which is of a greatly simplified construction as compared with air brake apparatus heretofore proposed. The improved apparatus, and particularly the control valve mechanism thereof, has been so simplified by this invention as to have low initial and maintenance costs and such that adjustments and repairs thereto can be readily made by any competent railway air brake mechanic. The simplified construction is devoid of slide valves, which have heretofore been prone to stick and leak and are expensive to manufacture and to maintain in proper operating condition. Moreover, the improved control valve mechanism is relatively light in weight, as compared with corresponding mechanisms heretofore used, and has the further advantage that it is interchangeable with existing control valve mechanisms now in use.

Another important advantage which will now be readily recognized for the improved air brake apparatus, is that the troublesome condition of stuck brakes has been substantially eliminated and a positive and definite brake releasing action is dependably obtained under all conditions of operation. This brake-releasing function utilizes the novel feature of creating a brake-releasing impulse wave in the train pipe by which it will be assured that the valve mechanisms on adjacent cars will likewise promptly assume the release position.

It will now also be recognized that in this novel air brake apparatus the possibility of an undesired emergency application of the brake is substantially eliminated and that a desired emergency application will always be obtainable regardless of whether the need for the emergency application immediately follows or precedes a service application of the brake.

Another important advantage which will now be recognized for the improved apparatus is that a desired effective pressure in the brake cylinder will be obtainable in direct proportion to the train pipe pressure reduction being made, regardless of uneven brake cylinder piston travel or brake cylinder leakage.

A further important advantage which should now be recognized for the improved apparatus is that the brake cylinder pressure will be varied automatically in accordance with changes in the load condition of the car and that relatively simple but reliable mechanism is provided for the attainment of this automatic function. It should also be noted that it is never necessary to exhaust the reservoirs in order to assure proper functional performance of this load-responsive feature.

Other important advantages for the improved apparatus include the features of a variable recharge rate for the auxiliary reservoir which prevents overcharging in those control valve mechanisms which are located near the front end of the train; the feature of a quick initial charging of the supply reservoir and the feature of returning pressure fluid from the brake cylinder to the supply reservoir following an emergency application of the brake and thus conserving pressure fluid. The improved apparatus possesses the further advantage that the passages of the supply reservoir are controlled by self-closing valves such that the supply of pressure fluid will be trapped in the reservoir and will not become depleted while the car is standing on a siding.

Another advantage to be mentioned is the provision of the above described release control chamber which cooperates with the emergency piston in creating the brake releasing impulse wave for insuring a positive brake releasing function and a desired movement of the various parts to their predetermined definite release positions. Another advantage in the improved apparatus is that the service and emergency vent valves are self-closing valves which are arranged to be actuated in a positive and direct manner by the service and emergency pistons.

Although the improved air brake apparatus has been described herein to a detailed extent, it should be understood that the invention is not intended to be limited correspondingly in scope, but includes all changes and modifications coming within the terms of the appended claims.

Having thus described my invention I claim:

1. In a fluid pressure brake, a control valve mechanism including a housing having train pipe, auxiliary reservoir, supply reservoir, brake cylinder and atmosphere connections, valve means in said housing controlling said auxiliary reservoir, supply reservoir and brake cylinder connections, self-closing valve means controlling said atmosphere connection including a movable valve element, a piston adapted to be acted upon by auxiliary reservoir and train pipe pressures and to be shifted in response to a differential therebetween, and means enabling said piston to impart movement to said valve element during a portion of the travel of the piston in one direction only comprising a thrust member hinged for swinging transversely of the direction of piston movement and means for causing such swinging of said thrust member for releasing said valve element to permit reclosing thereof upon completion of said portion of the piston travel in said one direction.

2. In a fluid pressure brake, a control valve mechanism including a housing having train pipe, auxiliary reservoir, supply reservoir, brake cylinder and atmosphere connections, valve means in said housing controlling said auxiliary reservoir, supply reservoir and brake cylinder connections, other valve means controlling said atmosphere connection including a movable valve element and a spring urging the valve element toward closed position, a piston adapted to be acted upon by auxiliary reservoir and train pipe pressures and to be shifted in response to a differential therebetween, thrust transmitting means adapted to shift said valve element to open position during travel of the piston in one direction including a swinging thrust member, and means for imparting swinging to said thrust member for causing said thrust transmitting means to release said valve element upon predetermined travel of said piston in said one direction and to be reset during travel of said piston in the other direction.

3. In a fluid pressure brake, a control valve mechanism including a housing having train pipe, auxiliary reservoir, supply reservoir, brake cylinder and atmosphere connections, valve means in said housing controlling said auxiliary reservoir, supply reservoir and brake cylinder connections, other valve means controlling said atmosphere connection including a movable valve element and a spring urging the valve element toward closed position, a piston adapted to be acted upon by auxiliary reservoir and train pipe pressures and to be shifted in response to a differential therebetween, a thrust member adapted to engage and shift said valve element to open position during travel of the piston in one direction, and a hinge connection between said piston and thrust member permitting swinging of the latter transversely of the direction of piston travel to a set position for engagement with said valve element.

4. In a fluid pressure brake, a control valve mechanism including a housing having train pipe, auxiliary reservoir, supply reservoir, brake cylinder and atmosphere connections, valve means in said housing controlling said auxiliary reservoir, supply reservoir and brake cylinder connections, other valve means controlling said atmosphere connection including a movable valve element and a spring urging the valve element toward closed position, a piston adapted to be acted upon by auxiliary reservoir and train pipe pressures and to be shifted in response to a differential therebetween, a thrust member adapted to engage and shift said valve element to open position during travel of the piston in one direction, a hinge connection between said piston and thrust member permitting swinging of the latter transversely of the direction of piston travel to a set position for engagement with said valve element, a spring urging said thrust member toward said set position, and means for causing swinging of said thrust member so as to disengage said valve element during travel of the piston in said one direction.

5. In a fluid pressure brake, a control valve mechanism including a housing having train pipe, auxiliary reservoir, supply reservoir and brake cylinder connections, valve devices in said housing controlling certain of said connections, means for actuating certain of said valve devices including a piston in said housing adapted to be acted upon by auxiliary reservoir and train pipe pressures and to be shifted in response to a differential therebetween, said piston having a feed passage and valve chamber therein for admitting train pipe pressure to said auxiliary reservoir, and a valve in said valve chamber and carried by said piston and being movable relative thereto for controlling said feed passage, said valve having a stem projecting from said valve chamber and provided with a groove forming a portion of said feed passage and said stem being shiftable by engagement with a portion of said housing to open said valve and vary the flow capacity of said groove upon movement of said piston toward said release position.

6. In a fluid pressure brake, a control valve mechanism including a housing having train pipe, auxiliary reservoir, supply reservoir and brake cylinder connections, valve devices in said housing controlling certain of said connections, means for actuating certain of said valve devices including a piston in said housing adapted to be acted upon by auxiliary reservoir and train pipe pressures and to be shifted in response to a differential therebetween, said piston having a release position corresponding with a released condition of the brake and also having a feed passage therein for admitting train pipe pressure to said auxiliary reservoir, a valve carried by said piston and movable relative thereto for controlling said feed passage, a spring urging said valve toward closed position, and a stem adapted to cause unseating of said valve when said piston moves to said release position.

7. In a fluid brake, a supply reservoir, a brake cylinder, an auxiliary reservoir, an application chamber, a housing having therein a train pipe connection and a connection to atmosphere from said application chamber, said housing also having connections to said supply reservoir, brake cylinder and auxiliary reservoir, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a valve controlling said atmosphere connection and being movable in a direction transversely to the travel of said piston, means responsive to auxiliary reservoir pressure for urging said valve toward closed position, and cam means actuated by movement of said piston and adapted to cause a positive opening of said valve in opposition to said auxiliary reservoir pressure.

8. In a fluid pressure brake, a brake cylinder, a supply reservoir, an auxiliary reservoir, an application chamber, a control valve mechanism including a housing having therein a train pipe connection and a connection to atmosphere from said application chamber, said housing also having connections to said auxiliary reservoir, supply reservoir and brake cylinder, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a valve element controlling said atmosphere connection, a stem connected with said piston, a cam on said stem, and push rod means actuated by said cam for imparting movement to said valve element.

9. In a fluid brake, a supply reservoir, a brake cylinder, an auxiliary reservoir, an application chamber, a housing having therein a train pipe connection and a connection to atmosphere from said application chamber, said housing also having connections to said supply reservoir, brake cylinder and auxiliary reservoir, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a valve controlling said atmosphere connection, a pair of diaphragms associated with said valve and acted upon by auxiliary reservoir pressure for urging the valve toward open and closed positions respectively and of which the valve closing diaphragm has the greater area, and mechanical means responsive to movement of said piston and adapted to cause a positive opening of said valve.

10. In a fluid pressure brake, a brake cylinder, a supply reservoir, an auxiliary reservoir, an application chamber, a control valve mechanism including a housing having therein a train pipe connection and a connection to atmosphere from said application chamber, said housing also having connections to said auxiliary reservoir, supply reservoir and brake cylinder, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a diaphragm valve element controlling said atmosphere connection and being acted upon by auxiliary reservoir pressure for urging the same toward closed position, a diaphragm plunger movable transversely to the travel of said piston and being acted upon by auxiliary reservoir pressure for urging the plunger in a direction to cause opening of said diaphragm valve element, push pins interposed between said plunger and said diaphragm valve element for transmitting valve opening movement to the latter, and cam means actuated by said piston and adapted to impart valve opening movement to said plunger.

11. In a fluid brake, a supply reservoir, a brake cylinder, an auxiliary reservoir, an application chamber, a housing having therein a train pipe connection and a connection to atmosphere from said application chamber, said housing also having connections to said supply reservoir, brake cylinder and auxiliary reservoir, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a valve body member connected with said housing and having a portion of said atmosphere connection formed therein, a valve seat carried by said body member and surrounding said atmosphere connection, a valve member on one side of said body member and cooperating with said seat for controlling said atmosphere connection, a plunger on the other side of said body member and being movable in a direction transversely to the travel of said piston, push pins disposed between said valve member and said plunger and guided in said body member, diaphragms associated with said plunger and valve member and acted upon by auxiliary reservoir pressure for urging said valve member toward its open and closed positions respectively and of which the valve closing diaphragm has the greater area, and cam means actuated by said piston and engageable with said plunger for causing a positive opening of said valve member.

12. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a valve controlling said passage, said piston having an axial stem projection thereon, spring means acting to cause closing of said valve, and a lost-motion operating connection between said piston stem and valve for causing opening actuation of the latter.

13. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a valve controlling said passage and being movable substantially in the direction of travel of said piston, an axial stem carried by said piston, spring means acting to cause closing of said valve, and an operating connection between said piston stem and valve including cooperating pin and slot elements operable to cause opening of the valve.

14. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, an auxiliary cylinder carried by said piston and connected with said auxiliary reservoir, a valve controlling said passage and having a plunger portion operable in said auxiliary cylinder, and means limiting the relative movement between said plunger and auxiliary cylinder.

15. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder, a piston in said housing adapted to be acted upon by auxiliary reservoir and train pipe pressures and to be shifted to service and emergency positions in response to service and emergency train pipe pressure reductions, means responsive to pressure variations in said application chamber for causing motive fluid to be supplied to said brake cylinder from said supply reservoir, a valve controlling said passage, an axial stem on said piston, and means connecting said valve with said piston stem for actuation thereby so that movement of the piston to said service position produces a passage opening of one size and movement of the piston to said emergency position produces a passage opening of substantially greater size.

16. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder, a piston in said housing adapted to be acted upon by auxiliary reservoir and train pipe pressures and to be shifted to service and emergency positions in response to service and emergency train pipe pressure reductions, means responsive to pressure variations in said application chamber for causing motive fluid to be supplied to said brake cylinder from said supply reservoir, a valve controlling said passage and being movable substantially in the direction of travel of said piston, an axial stem carried by said piston, and means connecting said valve with said piston stem for actuation by the latter to different positions corresponding with the service and emergency positions of the piston, said valve having control passages therein adapted to be uncovered in succession during movement of the valve to said different positions.

17. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder and a connection to atmosphere from said application chamber, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a release valve controlling said atmosphere connection, an inlet valve controlling the passage to said application chamber, diaphragm means associated with said release valve and adapted to be acted upon by auxiliary reservoir pressure for closing the release valve, and operating connections between said piston and valves and being responsive to movement of said piston in one direction for causing actuation of said valves in succession, said operating connections being adapted to permit closing of said release valve by said auxiliary reservoir pressure and to transmit said movement of the piston directly to said inlet valve for opening the same.

18. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder and a connection to atmosphere from said application chamber, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a release valve controlling said atmosphere connection and being movable in a direction transversely to the travel of said piston, cam means adapted to cause actuation of said release valve in response to movement of said piston, an inlet valve controlling the passage to said application chamber, and a lost-motion operating connection between said inlet valve and piston and adapted to cause actuation of the inlet valve by the piston in timed relation to the actuation of said release valve.

19. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder and a connection to atmosphere from said application chamber, a piston in said housing adapted to be acted upon by auxiliary reservoir and train pipe pressures and to be shifted in response to a differential therebetween, means responsive to pressure variations in said application chamber for causing motive fluid to be supplied to said brake cylinder from said supply reservoir, a release valve controlling said atmosphere connection and being movable in a direction transversely to the travel of said piston, diaphragm means associated with said release valve and adapted to be acted upon by auxiliary reservoir pressure for closing the release valve, cam means actuated by said piston and adapted to permit closing of the release valve by said auxiliary reservoir pressure, an inlet valve controlling the passage to said application chamber, and a lost-motion operating connection between said inlet valve and piston for causing opening of the inlet valve subsequent to the closing of said release valve.

20. In a fluid pressure brake, a supply reservoir, a brake cylinder, an auxiliary reservoir, an application chamber, a housing having therein a train pipe connection and a passage between said auxiliary reservoir and application chamber, said housing also having connections to said supply and auxiliary reservoirs and said brake cylinder and a connection to atmosphere from said application chamber, a piston in said housing adapted to be acted upon by auxiliary reservoir and train pipe pressures and to be shifted to service and emergency positions in response to service and emergency train pipe pressure reductions, means responsive to pressure variations in said application chamber for causing motive fluid to be supplied to said brake cylinder from said supply reservoir, a release valve controlling said atmosphere connection and being movable in a direction transversely to the travel of said piston, cam means adapted to actuate said release valve and to cause closing thereof upon movement of the piston to said service position, an inlet valve controlling the passage to said application chamber and being movable substantially in the direction of travel of said piston, and means connecting said inlet valve with said piston for actuation by the latter to different positions corresponding with the service and emergency positions of the piston, said inlet valve having control passages therein adapted to be uncovered in succession during movement thereof to said different positions.

21. In a fluid pressure brake, a supply reservoir, a brake cylinder, an auxiliary reservoir, an application chamber, a housing having therein a train pipe connection and also having connections to said supply and auxiliary reservoirs, said brake cylinder and said application chamber, a piston in said housing adapted to be acted upon by auxiliary reservoir and train pipe pressures and being shiftable in response to a differential therebetween, means responsive to pressure variations in said application chamber for causing motive fluid to be supplied to said brake cylinder from said supply reservoir, valve means in said housing adapted to be actuated in response to shifting of said piston for causing the pressure variations in said application chamber, and means in said housing responsive to brake-releasing train pipe pressure for discharging pressure fluid from said supply reservoir into said train pipe connection for supplementing the brake-releasing pressure.

22. In a fluid pressure brake, a supply reservoir, a brake cylinder, a housing containing an auxiliary reservoir and an application chamber and also having therein a train pipe connection and a connection between said auxiliary reservoir and said application chamber, a piston in said housing adapted to be acted upon by auxiliary reservoir and train pipe pressures and being shiftable in response to a differential therebetween, means responsive to pressure variations in said application chamber for causing motive fluid to be supplied to said brake cylinder from said supply reservoir, valve means in said housing adapted to be actuated in response to shifting of said piston for causing the pressure variations in said application chamber, a second piston movable in said housing and adapted to be shifted by brake-releasing train pipe pressure, and valve means adapted to be opened upon such shifting of said second piston for discharging pressure fluid from said supply reservoir into said train pipe connection for supplementing the brake-releasing pressure.

23. In a fluid brake, a supply reservoir, a brake cylinder, a housing containing an auxiliary reservoir, an application chamber and a release control chamber, said housing also having therein a train pipe connection and a passage between said auxiliary reservoir and said application chamber, a first piston in said housing adapted to be acted upon by auxiliary reservoir and train pipe pressures and being shiftable in response to a differential therebetween, means responsive to pressure variations in said application chamber for causing motive fluid to be supplied to said brake cylinder from said supply reservoir, valve means in said housing adapted to be actuated in response to shifting of said first piston for causing the pressure variations in said application chamber, a second piston in said housing adapted to be acted upon by train pipe and release control chamber pressures and being shiftable in response to a differential therebetween, and valve means adapted to be opened upon such shifting of said second piston for discharging pressure fluid from said supply reservoir into said train pipe connection.

24. In a fluid brake, a supply reservoir, a brake cylinder, a housing containing an auxiliary reservoir, an application chamber and a release control chamber, said housing also having therein a train pipe connection and a passage between said auxiliary reservoir and said application chamber, a first piston in said housing adapted to be acted upon by auxiliary reservoir and train pipe pressures and being shiftable in response to a differential therebetween, means responsive to pressure variations in said application chamber for causing motive fluid to be supplied to said brake cylinder from said supply reservoir, valve means in said housing adapted to be actuated in response to shifting of said first piston for causing the pressure variations in said application chamber, a second piston in said housing adapted to be acted upon by train pipe and release control chamber pressures and being shiftable in response to a differential therebetween, a connecting passage connecting said release control chamber and said supply reservoir with said train pipe connection, a check valve controlling said connecting passage and opening toward said train pipe connection, and a valve controlling communication between said supply reservoir and said connecting passage and adapted to be opened by such shifting of said second piston for discharging pressure fluid from the supply reservoir through said connecting passage and check valve into said train pipe connection.

25. A fluid brake as defined in claim 24 in which said connecting passage has restricted communication with said release control chamber.

26. In a fluid brake, a supply reservoir, an auxiliary reservoir, a brake cylinder, a housing containing a release control chamber and also having therein train pipe and auxiliary reservoir connections and a connection between said supply reservoir and said release control chamber, a first piston in said housing adapted to be acted upon by auxiliary reservoir and train pipe pressures and being shiftable in response to a differential therebetween, means responsive to such shifting of said first piston for causing pressure fluid to be supplied to said brake cylinder from said supply reservoir, a second piston in said housing adapted to be acted upon by train pipe and release control chamber pressures and being shiftable in response to a differential therebetween, said second piston having a transfer passage therein for connecting said release control chamber with said train pipe connection, a check valve controlling said transfer passage and adapted to open toward said train pipe connection, and a supply reservoir discharge valve adapted to be opened by such shifting of said second piston for discharging pressure fluid from said supply reservoir through said transfer passage and check valve into said train pipe connection.

27. A fluid brake as defined in claim 26 in which said second piston has a stem thereon containing said transfer passage and is adapted to engage and open said supply reservoir discharge valve.

28. In a fluid brake, a supply reservoir, an auxiliary reservoir, a brake cylinder, a housing containing a release control chamber and also having therein train pipe, auxiliary reservoir and atmosphere connections, a relief passage connecting said release control chamber and said supply reservoir with said train pipe connection, a first piston in said housing adapted to be acted upon by auxiliary reservoir and train pipe pressures and being shiftable in response to a differential therebetween, means responsive to such shifting of said first piston for causing pressure fluid to be supplied to said brake cylinder from said supply reservoir, a check valve controlling said relief passage between said release control chamber and said train pipe connection and adapted to open toward the latter, a supply reservoir discharge valve controlling communication between said relief passage and said supply reservoir, a vent valve controlling said atmosphere connection, and a second piston in said housing adapted to be acted upon by train pipe and release control chamber pressures and being shiftable in one direction in response to a differential therebetween for opening said vent valve and in the other direction in response to another differential therebetween for opening said supply reservoir discharge valve.

29. A fluid brake as defined in claim 28 in which said relief passage has restricted communication with said release control chamber.

30. A fluid brake as defined in claim 28 in which said second piston has a stem thereon adapted to engage and open said supply reservoir discharge valve and said relief passage being located in said stem.

31. A fluid brake as defined in claim 26 in which the transfer passage of said second piston is in permanently open restricted communication with said release control chamber.

32. A fluid brake as defined in claim 26 in which said second piston has a stem thereon adapted to engage and open said supply reservoir discharge valve and said transfer passage is located in said stem and has permanently open restricted communication with the release control chamber.

33. A fluid brake as defined in claim 28 in which said supply reservoir discharge valve, said check valve and said vent valve are disposed substantially in alignment with each other and are located substantially on the axis of said second piston.

34. In a fluid brake, a supply reservoir, an auxiliary reservoir, a brake cylinder, a housing having therein a train pipe connection and an emergency vent connection to atmosphere and also having connections to said supply reservoir, auxiliary reservoir and brake cylinder, a service piston in said housing adapted to be shifted in response to service and emergency reductions in train pipe pressure, relay valve means adapted to be actuated by auxiliary reservoir pressure for causing pressure fluid to be supplied to said brake cylinder from said supply reservoir, valve means responsive to shifting of said service piston for supplying auxiliary reservoir pressure to said relay valve means, an emergency piston in said housing, an emergency vent valve controlling said emergency vent connection and adapted to be opened by shifting of said emergency piston in response to an emergency train pipe reduction, an equalizing passage connecting said supply reservoir with said auxiliary reservoir, and an equalizing valve controlling said equalizing passage and adapted to be opened in response to opening of said emergency vent valve.

35. A fluid brake as defined in claim 34 in which said equalizing valve is a fluid pressure responsive valve and the opening thereof is assisted by the pressure of said auxiliary reservoir.

36. In a fluid brake, a supply reservoir, an auxiliary reservoir, a brake cylinder, an application chamber, a housing having therein a train pipe connection and an emergency vent connection to atmosphere and also having connections to said supply reservoir, auxiliary reservoir, application chamber and brake cylinder, a service piston in said housing adapted to be shifted in response to service and emergency reductions in train pipe pressure, valve means responsive to shifting of said service piston for causing pressure fluid to be supplied from said auxiliary reservoir to said application chamber, other valve means adapted to be actuated in response to pressure variations in said application chamber for causing pressure fluid to be supplied to said brake cylinder from said supply reservoir, an emergency piston in said housing, an emergency vent valve controlling said emergency vent connection and adapted to be opened by shifting of said emergency piston in response to an emergency train pipe reduction, an equalizing passage connecting said supply reservoir with said auxiliary reservoir and application chamber, and an equalizing valve controlling said equalizing passage and adapted to be opened in response to opening of said emergency vent valve.

37. In a fluid brake, a supply reservoir, an auxiliary reservoir, a brake cylinder, an application chamber, a housing containing a release control chamber and train pipe and emergency atmosphere connections, said housing also having connections to said supply reservoir, auxiliary reservoir, application chamber and brake cylinder, a service piston in said housing adapted to be shifted in response to service and emergency reductions in train pipe pressure, valve means responsive to shifting of said service piston for causing pressure fluid to be supplied from said auxiliary reservoir to said application chamber, other valve means adapted to be actuated in response to pressure variations in said application chamber for causing pressure fluid to be supplied to said brake cylinder from said supply reservoir, an emergency piston in said housing, an emergency vent valve controlling said emergency atmosphere connection and adapted to be opened by shifting of said emergency piston in response to an emergency train pipe reduction, a relief passage extending between said release control chamber and said train pipe connection, a check valve controlling said relief passage and adapted to be opened to discharge pressure fluid from said release control chamber into said train pipe connection in response to opening of said emergency vent valve, an equalizing passage connecting said supply reservoir with said auxiliary reservoir and application chamber, an equalizing valve controlling said equalizing passage, and pressure responsive means acted upon in one direction by release control chamber pressure for closing the equalizing valve and acted upon in the other direction by auxiliary reservoir pressure for causing opening of the equalizing valve in response to the relief of pressure from said release control chamber.

38. In an air brake control valve mechanism; a housing having an application chamber therein and also having passage means therein adapted for connection with a train pipe, a supply reservoir, an auxiliary reservoir and a brake cylinder and including a vent passage for connecting said application chamber with atmosphere; a piston in said housing having opposite sides thereof subjected to auxiliary reservoir and train pipe pressures and adapted to be shifted in response to a differential therebetween; valve means responsive to actuation of said piston for supplying pressure fluid to said application chamber; a second valve means responsive to variation in the pressure of said application chamber for causing pressure fluid to be supplied to said brake cylinder from the supply reservoir; a third valve means controlling said vent passage; said third valve means being subjected on opposite sides thereof to auxiliary reservoir pressure to partially balance the same but being biased toward closed position by said auxiliary reservoir pressure; and mechanical means responsive to movement of said piston for causing a positive opening of said third valve means in opposition to said auxiliary reservoir pressure bias.

39. In an air brake control valve mechanism; a housing having passage means therein adapted for connection with a train pipe, a supply reservoir, an auxiliary reservoir, a brake cylinder, an application chamber and atmosphere; a service piston reciprocably movable in said housing in response to pressure differential between the train pipe and the auxiliary reservoir; a first valve device in said housing controlling the delivery of pressure fluid to said application chamber from said auxiliary reservoir; a second valve device in said housing controlling the venting of said application chamber to atmosphere; said first and second valve devices being adapted for actuation in succession in response to movement of said piston such that said second valve device will be closed in advance of the opening of the first valve device during movement of said piston in one direction and said first valve device will be closed in advance of the opening of said second valve device during movement of said piston in the opposite direction; said second valve device having opposed pressure areas and being partially balanced by the pressure of the auxiliary reservoir on said areas but being biased toward closed position by the auxiliary reservoir pressure; and a third valve device of the pressure-balanced diaphragm-piston actuated type in said housing, responsive to pressure variation in said application chamber effected by the actuation of said first and second valve devices, for controlling the delivery of pressure fluid to the brake cylinder from the supply reservoir and the discharge of fluid from said brake cylinder to atmosphere.

40. In an air brake control valve mechanism; a housing having a control chamber therein and also having passage means therein adapted for connection with a train pipe, a supply reservoir, an auxiliary reservoir, a brake cylinder, said control chamber and atmosphere, and including an emergency vent passage; a service piston operable in said housing in response to pressure differential between the train pipe and auxiliary reservoir; poppet type valve means in said housing responsive to both service and emergency actuations of said service piston for causing pressure fluid to be delivered to the brake cylinder from the supply reservoir and to be exhausted from the brake cylinder; an emergency piston operable in said housing in response to pressure differential between said control chamber and said train pipe; a poppet type vent valve controlling said emergency vent passage; said vent valve being located in said housing on one side of said emergency piston and adapted to be opened by direct axial thrust from said emergency piston and movement of said emergency piston in one direction in response to an emergency reduction in train pipe pressure; other passage means in said housing for connecting the supply reservoir with the train pipe; poppet type valve means located on the opposite side of said emergency piston and controlling said other passage means and adapted to be opened by direct axial thrust from said emergency piston upon movement of said emergency piston in the opposite direction in response to an increase in train pipe pressure; and relief passage means in said housing providing restricted communication with said control chamber for relieving control chamber pressure to the train pipe during service reductions in train pipe pressure; said other passage means extending through said emergency piston and said relief passage means providing restricted communication between said control chamber and said other passage means.

41. In an air brake control valve mechanism; a housing having a control chamber therein and also having passage means therein adapted for connection with a train pipe, a supply reservoir, an auxiliary reservoir, a brake cylinder, said control chamber and atmosphere, and including an emergency vent passage; a service piston operable in said housing in response to pressure differential between the train pipe and auxiliary reservoir; poppet type valve means in said housing responsive to both service and emergency actuations of said service piston for causing pressure fluid to be delivered to the brake cylinder from the supply reservoir and to be exhausted from the brake cylinder; and emergency piston operable in said housing in response to pressure differential between said control chamber and said train pipe; a poppet type vent valve controlling said emergency vent passage; said vent valve being located in said housing on one side of said emergency piston and adapted to be opened by direct axial thrust from said emergency piston and movement of said emergency piston in one direction in response to an emergency reduction in train pipe pressure; other passage means in said housing for connecting the supply reservoir with the train pipe; poppet type valve means located on the opposite side of said emergency piston and controlling said other passage means; and relief passage means in said housing providing restricted communication with said control chamber for relieving control chamber pressure to the train pipe during service reductions in train pipe pressure; said emergency piston having an axial stem and said other passage means extending through said stem and said relief passage means providing restricted communication between said control chamber and the passage of said stem; said valve means located on the opposite side of said emergency piston being adapted to be engaged and opened by said stem upon movement of said emergency piston in the opposite direction in response to an increase in train pipe pressure.

42. In an air brake control valve mechanism; a housing having a control chamber therein and also having passage means therein adapted for connection with a train pipe, a supply reservoir, an auxiliary reservoir, a brake cylinder, said control chamber and atmosphere; a service piston movable in said housing in response to pressure differential between the train pipe and auxiliary reservoir; valve means in said housing responsive to both service and emergency actuations of said service piston for causing pressure fluid to be supplied to the brake cylinder from the supply reservoir and to be exhausted from the brake cylinder; an emergency piston movable in said housing in response to pressure differential between said control chamber and said train pipe; a vent valve adapted to be opened in response to an emergency actuation of said emergency piston for venting said train pipe to atmosphere; said emergency piston having a passage extending therethrough; a check valve adjacent the outer end of such piston passage and adapted to open toward said train pipe; other valve means adjacent the other end of said piston passage adapted to be opened by movement of said emergency piston in response to increase in train pipe pressure for discharging pressure fluid into said piston passage from said supply reservoir; and means providing a restricted communication connecting said control chamber with said piston passage at a point between said check valve and said other valve means.

43. In an air brake control valve mechanism; a housing having a control chamber therein and also having passage means therein adapted for connection with a train pipe, a supply reservoir, an auxiliary reservoir, a brake cylinder, said control chamber and atmosphere; a service piston movable in said housing in response to pressure differential between the train pipe and auxiliary reservoir; valve means in said housing responsive to movement of said service piston for causing pressure fluid to be supplied to the brake cylinder from the supply reservoir and to be exhausted from said brake cylinder; an emergency piston movable in said housing in response to pressure differential between said control chamber and said train pipe; a vent valve adapted to be opened in response to movement of said emergency piston for venting said train pipe to atmosphere; and other valve means responsive to movement of said emergency piston for charging said control chamber from the supply reservoir.

44. In an air brake control valve mechanism; a housing having a control chamber therein and also having passage means therein adapted for connection with a train pipe, a supply reservoir, an auxiliary reservoir, a brake cylinder, said control chamber and atmosphere; a service piston movable in said housing in response to pressure differential between the train pipe and auxiliary reservoir; valve means in said housing responsive to movement of said service piston for causing pressure fluid to be supplied to the brake cylinder from the supply reservoir and to be exhausted from said brake cylinder; and emergency piston movable in said housing in response to pressure differential between said control chamber and said train pipe and being movable in one direction in response to an emergency reduction in train pipe pressure and in the opposite direction in response to an increase in train pipe pressure during the release of the brake; a vent valve adapted to be opened in response to movement of said emergency piston in said one direction for venting said train pipe to atmosphere; and a normally closed valve adapted to be opened by movement of the emergency piston in said opposite direction for charging said control chamber from said supply reservoir.

45. In an air brake control valve mechanism; a housing having a control chamber therein and also having passage means therein adapted for connection with a train pipe, a supply reservoir, an auxiliary reservoir, a brake cylinder, said control chamber and atmosphere; a service piston movable in said housing in response to pressure differential between the train pipe and auxiliary reservoir; valve means in said housing responsive to both service and emergency actuations of said service piston for causing pressure fluid to be supplied to the brake cylinder from the supply reservoir and to be exhausted from the brake cylinder; an emergency piston movable in said housing in response to pressure differential between said control chamber and said train pipe; a vent valve adapted to be opened in response to an emergency actuation of said emergency piston for venting said train pipe to atmosphere; means for releasing pressure from said control chamber during service reductions in train pipe pressure; and valve means adapted to be opened by movement of said emergency piston in response to increase in brake pipe pressure for charging said control chamber from said supply reservoir.

46. In an air brake control valve mechanism; a housing having a control chamber therein and also having passage means therein adapted for connection with a train pipe, a supply reservoir, an auxiliary reservoir, a brake cylinder, said control chamber and atmosphere; a service piston movable in said housing in response to pressure differential between the train pipe and auxiliary reservoir; valve means in said housing responsive to both service and emergency actuations of said service piston for causing pressure fluid to be supplied to the brake cylinder from the supply reservoir and to be exhausted from the brake cylinder; an emergency piston movable in said housing in response to pressure differential between said control chamber and said train pipe; a vent valve adapted to be opened in response to an emergency actuation of said emergency piston for venting said train pipe to atmosphere; means for releasing pressure from said control chamber during service reductions in train pipe pressure; and a single valve adapted to be opened by movement of said emergency piston in response to increase in brake pipe pressure for discharging pressure fluid from said supply reservoir for delivery of a portion of such pressure fluid into the train pipe for facilitating the release of the brake and another portion into said control chamber for recharging the same.

47. In an air brake control valve mechanism; a housing having therein an auxiliary reservoir, an application chamber and a control chamber and also having passage means therein adapted for connection with a train pipe, a supply reservoir, a brake cylinder and atmosphere; a service piston movable in said housing in response to pressure differential between the train pipe and auxiliary reservoir; valve means responsive to brake-applying and brake-releasing movements of said service piston for supplying pressure fluid to and exhausting the same from said application chamber; valve means responsive to pressure variations in said application chamber for causing supply reservoir pressure to be supplied to and exhausted from said brake cylinder; an emergency piston movable in said housing in response to pressure differential between the train pipe and said control chamber; a vent valve adapted to be opened in response to an emergency actuation of said emergency piston for venting said train pipe to atmosphere; and valve means adapted to be opened by movement of said emergency piston in response to an increase in train pipe pressure for charging said control chamber from the supply reservoir.

48. In an air brake control valve mechanism; a housing having therein an auxiliary reservoir, an application chamber and a control chamber and also having passage means therein adapted for connection with a train pipe, a supply reservoir, a brake cylinder and atmosphere; a service piston movable in said housing in response to pressure differential between the train pipe and auxiliary reservoir; valve means responsive to brake-applying and brake-releasing movements of said service piston for supply pressure fluid to and exhausting the same from said application chamber; valve means responsive to pressure variations in said application chamber for causing supply reservoir pressure to be supplied to and exhausted from said brake cylinder; an emergency piston movable in said housing in response to pressure differential between the train pipe and said control chamber and being movable in one direction in response to an emergency reduction in train pipe pressure and in the opposite direction in response to an increase in train pipe pressure; a vent valve adapted to be opened in response to movement of said emergency piston in said one direction for venting said train pipe to atmosphere; means providing a restricted passage for relieving the pressure of said control chamber to the train pipe during a service reduction in train pipe pressure; and valve means adapted to be opened in response to movement of said emergency piston in said opposite direction for discharging pressure fluid from said supply reservoir for delivery into the train pipe for facilitating release of the brake and for delivery to said control chamber for recharging the same.

JACOB RUSH SNYDER.

REFERENCES CITED

The following references are of record in the file of this patent:

UNITED STATES PATENTS

| Number | Name | Date |
|---|---|---|
| 431,304 | Williams | July 1, 1890 |
| 802,913 | Chapsal et al. | Oct. 24, 1905 |
| 836,886 | Mann | Nov. 27, 1906 |
| 950,539 | Mann | Mar. 1, 1910 |

(Other references on following page)

UNITED STATES PATENTS

| Number | Name | Date |
|---|---|---|
| 978,640 | Pendry | Dec. 13, 1910 |
| 1,116,564 | Christensen | Nov. 10, 1914 |
| 1,131,178 | Turner | Mar. 9, 1915 |
| 1,262,883 | Weimer | Apr. 16, 1918 |
| 1,297,520 | Turner | Mar. 18, 1919 |
| 1,571,506 | Bozic | Feb. 2, 1926 |
| 1,582,918 | Farmer | May 4, 1926 |
| 1,626,604 | Farmer | May 3, 1927 |
| 2,013,031 | Campbell | Sept. 3, 1933 |
| 1,967,299 | Farmer | July 24, 1934 |
| 2,034,296 | Hewitt | Mar. 17, 1936 |
| 2,066,404 | Kasantzeff | Jan. 5, 1937 |
| 2,152,257 | Hewitt et al. | Mar. 28, 1939 |
| 2,173,928 | Borde et al. | Sept. 26, 1939 |
| 2,178,927 | Campbell | Nov. 27, 1939 |
| 2,184,551 | Hewitt | Dec. 26, 1939 |
| 2,367,604 | Oliver | Jan. 16, 1945 |
| 2,405,632 | Baldwin | Aug. 13, 1946 |